United States Patent
Obayashi et al.

(10) Patent No.: US 8,504,228 B2
(45) Date of Patent: Aug. 6, 2013

(54) APPARATUS FOR MANAGING ENERGY SUPPLIED TO FUNCTIONAL DEVICE UNITS REALIZING A SPECIFIC FUNCTION

(75) Inventors: Kazuyoshi Obayashi, Aichi-ken (JP); Akira Sakamoto, Oobu (JP)

(73) Assignee: Denso Corporation, Kariya (JP)

( * ) Notice: Subject to any disclaimer, the term of this patent is extended or adjusted under 35 U.S.C. 154(b) by 480 days.

(21) Appl. No.: 12/794,881

(22) Filed: Jun. 7, 2010

(65) Prior Publication Data

US 2010/0312425 A1  Dec. 9, 2010

(30) Foreign Application Priority Data

Jun. 5, 2009  (JP) ................. 2009-136541

(51) Int. Cl.
 *B60L 9/00* (2006.01)
(52) U.S. Cl.
 USPC ........................................................ 701/22
(58) Field of Classification Search
 USPC ........................................................... 701/22
 See application file for complete search history.

(56) References Cited

U.S. PATENT DOCUMENTS

| | | | |
|---|---|---|---|
| 6,157,008 A * | 12/2000 | Brown et al. ................. | 219/486 |
| 7,406,378 B2 | 7/2008 | Harada et al. | |
| 7,657,438 B2 | 2/2010 | Obayashi et al. | |
| 8,204,638 B2 * | 6/2012 | Tani et al. ....................... | 701/22 |
| 2004/0124703 A1 * | 7/2004 | Tani et al. ....................... | 307/10.1 |
| 2004/0164616 A1 | 8/2004 | Obayashi et al. | |
| 2007/0145924 A1 | 6/2007 | Obayashi | |
| 2007/0220883 A1 | 9/2007 | Harada et al. | |
| 2008/0011005 A1 | 1/2008 | Obayashi et al. | |
| 2010/0268407 A1 * | 10/2010 | Yanagisawa ................... | 701/22 |

FOREIGN PATENT DOCUMENTS

| | | |
|---|---|---|
| JP | 11-122713 | 4/1999 |
| JP | 2002-370529 | 12/2002 |
| JP | 2005-337173 | 12/2005 |
| JP | 3745677 | 2/2006 |
| JP | 3896973 | 3/2007 |
| JP | 2007-100687 | 4/2007 |
| JP | A-2007-176270 | 7/2007 |
| JP | 2008-018797 | 1/2008 |

OTHER PUBLICATIONS

Japanese Office Action dated Jul. 12, 2011, issued in corresponding Japanese Application No. 2009-136541 with English Translation.
Obayashi et al, "Concept of Vehicle Electric Power Flow Management System", Proceedings of the Japan Industry Applications Society Conference, 2008 Annual Conference of I.E.E. of Japan Industry Applications Society, Aug. 27, 2008 pp. II-137-142, with English Abstract.

* cited by examiner

*Primary Examiner* — Hussein A. Elchanti
(74) *Attorney, Agent, or Firm* — Nixon & Vanderhye PC

(57) ABSTRACT

An energy management apparatus is used to manage energy to be supplied to a system. A paid energy resource can be supplied to the system from the outside. The system is provided with two or more functional device units realizing a specific function using the input energy and adapted to satisfy an external request using at least one of the two or more functional device units such that supply of energy to the functional device units can be controlled. In the apparatus, a normalizing section normalizes input energy of each of the two or more functional device units in terms of the cost of the paid energy resource required for producing the input energy. In addition, a determining section determines to which of the two or more functional device units a predetermined quantity of energy should be fed such that the cost incurred in the system can be reduced.

30 Claims, 12 Drawing Sheets

APPARATUS FOR MANAGING ENERGY SUPPLIED TO FUNCTIONAL DEVICE UNITS REALIZING A SPECIFIC FUNCTION

CROSS-REFERENCE TO RELATED APPLICATION

This application is based on and claims the benefit of priority from earlier Japanese Patent Application No. 2009-136541 filed Jun. 5, 2009, the description of which is incorporated herein by reference.

BACKGROUND OF THE INVENTION

1. Technical Field of the Invention

The present invention relates to an energy management apparatus for managing energy to be supplied to a system, to which a paid energy resource can be supplied from outside, which is provided with two or more functional device units realizing a specific function using the input energy and satisfies an external request using at least one of the two or more functional device units, so that supply of energy to the functional device units can be controlled.

2. Related Art

In recent years, various techniques have been developed in terms of reducing energy consumption and the like in vehicles. For example, so-called hybrid vehicles have been developed, which are equipped with an internal combustion engine and an electric motor as main engines. In such a hybrid vehicle, however, the vehicle interior cannot be heated using the heat generated by the internal combustion engine when the internal combustion engine is not in operation. To cope with this, it has been suggested a heat pump be separately installed in such a hybrid vehicle so that the heat pump is actuated by the electric motor.

For example, JP-B-3745677 discloses a technique in terms of reducing energy consumption in vehicles. According to this technique, whether the regenerative energy during deceleration (hereinafter referred to as "deceleration regenerative energy") should be used for electric generation or for driving of the compressor of the on-vehicle air conditioner, is determined in accordance with the charge efficiency of the battery.

When a vehicle is capable of performing heating using a heat pump, in addition to heating using the heat of the internal combustion engine, it means that the vehicle has two functional device units that can realize the function of heating the vehicle interior. However, no principle has been established regarding which of the functional device units should be preferentially used.

Not only the hybrid vehicles mentioned above but also those systems which are provided with two or more functional device units for realizing a similar function generally suffer from the lack of principle that can direct which of similar functional device units should be supplied with energy to satisfy a certain request.

According to the technique described in JP-B-3745677 mentioned above, even when a vehicle is equipped with a solar photovoltaic power generator and the battery of the vehicle has been charged by the solar photovoltaic power generator, the deceleration regenerative energy may be supplied to the battery. However, when solar photovoltaic power generation is available in a vehicle, fuel consumption in the vehicle may be more reduced if the deceleration regenerative energy is supplied to the compressor of the on-vehicle air conditioner. Thus, when there are two or more destinations to which deceleration regenerative energy can be fed, the criteria regarding which of the destinations should be supplied with the energy has remained unimproved.

Not only the vehicles mentioned above, but also those systems which are provided with two or more destinations to which free of charge energy can be fed, are in a similar situation. That is, in these vehicles and systems, there is room for improving the criteria regarding which of the destinations should be supplied with the energy.

SUMMARY OF THE INVENTION

The present invention has been made in order to resolve the above issue, and has as its object to provide an energy management apparatus which is able to more appropriately determine to which of two or more functional device units a predetermined quantity of energy should be fed.

In order to achieve the above object, as a main structure of the present invention, there is provided an energy management apparatus for managing energy to be supplied to a system, to which a paid energy resource can be supplied from outside, which is provided with two or more functional device units realizing a specific function using the input energy and adapted to satisfy an external request using at least one of the two or more functional device units such that supply of energy to the functional device units can be controlled. The apparatus includes a normalizing means for normalizing input energy of each of the two or more functional device units in terms of the cost of the paid energy resource required for producing the input energy; and a determining means for determining to which of the two or more functional device units a predetermined quantity of energy should be fed such that the cost incurred in the system can be reduced.

In the above invention, when there are two or more candidates that can be the destinations of feeding given energy, the normalizing means can contribute to finally determining a destination for feeding the given energy, from choosing which candidate as a destination of feeding the given energy can reduce consumption of the paid energy resource.

Preferably, the apparatus further includes two or more functional device units, an input energy form of a specific functional device unit of the two or more functional device units being an output energy form, wherein the normalizing means includes a calculating means for calculating an average cost that is the cost required for producing a unit quantity of energy in the output energy form, and the determining means is adapted to determine utilizing the calculated average cost, to which of the two or more functional device units a predetermined quantity of energy should be fed.

When there are two or more functional device units each having an output energy form which is equal to an input energy for a different functional device unit, the cost incurred in producing the input quantity required for the different functional device units is calculated. In the calculation, it is convenient to use an average cost of the output energy of the two or more functional device units, without specifying which output of these functional device units is to be used as input. Therefore, the average cost is used in the above invention to enable easy and appropriate calculation of the cost that will be incurred in the required input.

Preferably, the two or more functional device units include two or more functional device units having a similar function; the predetermined quantity of energy is used by the two or more functional device units having the similar function to realize the similar function; and the determining means is adapted to determine a usage ratio of each of the two or more functional device units having the similar function for realizing the similar function.

When there are two or more functional device units that can realize a similar function, the function may be realized using any one of these functional device units. Accordingly, a reasonable reference is needed regarding which of the functional device units should be used. In this regard, the normalizing means can contribute to determining the usage ratio of each functional device unit in the above invention, from the standpoint of reducing consumption of a paid energy resource. Thus, consumption of the paid energy resource can be reduced.

The two or more functional device units that realize a similar function may include ones whose direct input energy forms are different from each other. In this case, the direct comparison between the quantities of the input energy cannot achieve a comparison between the consumptions of the paid energy resource. In this regard, the normalizing means has a particularly great potential.

The functional device units may include at least either two or more functional device units having a function of producing driving force, or two or more functional device units having a function of controlling the temperature of the same single object to be controlled. The same single object to be controlled may be the air in the vehicle interior concerned, or the air in the residential building concerned.

It is preferred that the determining means includes: a requested input quantity calculating means for, when a request that can be realized using the two or more functional device units having the similar function is received from outside, calculating a requested input quantity when using each of functional device units usable to satisfy the request; a cost calculating means for calculating a cost that will be incurred in the required input for each of the two or more functional device units having the similar function, using the normalizing means; and a usage ratio determining means for determining the usage ratio of each functional device unit based on the calculated cost.

In the above invention, the normalizing means contributes to obtaining the quantity of a paid energy resource to be consumed by input even when the input energy forms of the functional device units are different from each other.

It is preferred that the determining means is adapted to calculate in the case where a request that can be realized by the functional device units is received from outside by the requested input quantity calculating means, an input quantity required by each of the two or more similar functional device units having the similar function in the case where the external request can be cooperatively satisfied by the similar functional device units, in addition to the case where the external request can be satisfied by one of the similar functional device units.

In the above invention, two or more similar functional device units can be used at the same time so that the quantity of a paid energy resource to be consumed by the system can be reduced more.

It is preferred that the apparatus comprises two or more functional device units, an input energy form of a specific functional device unit of the two or more functional device units being an output energy form, wherein the normalizing means includes an average cost calculating means for calculating an average cost that is the cost required to produce a unit quantity of energy in the output energy form; and the cost calculating means is adapted to determine using the calculated average cost, the cost that will be incurred in providing the required input.

When there are two or more functional device units each having an output energy form which is equal to an input energy for a different functional device units, the cost incurred in producing the input quantity required for the different functional device units is calculated. In the calculation, it is convenient to use an average cost of the output energy of the two or more functional device units, without specifying which output of these functional device units is to be used as input. Therefore, the average cost is used in the above invention to enable easy and appropriate calculation of the cost that will be incurred in the required input.

It is preferred that the average cost for producing every unit quantity of output energy is calculated based on the history of the paid energy resource required.

The cost that will be incurred in producing a unit quantity of energy in the output energy form may vary. In such a case in the above invention, the present cost can be favorably predicted and quantified based on the trend of the quantity of a paid energy resource required for producing each unit quantity of output energy.

The system may be a vehicle system in which the two or more functional device units include an internal combustion engine and a rotary electric machine as on-vehicle main engines.

Regarding the internal combustion engine as an on-vehicle main engine, the direct input energy form is fuel, while the direct input energy form is electric energy regarding the rotary electric machine. The internal combustion engine and the rotary electric machine are different in this way. Nevertheless, the output energy form is the same between them both. Therefore, comparison of the quantities (power) of output energy between both types means that the difference in the consumptions of the paid energy resource between the different engines/motors can be obtained. Thus, the normalizing means has a particularly great potential.

In an apparatus in another example, the determining means is adapted to determine whether the internal combustion engine should be operated or stopped, based on a direct comparison between the cost incurred in the system with the internal combustion engine being operated and the cost incurred in the system with the internal combustion engine being stopped. In this configuration, an appropriate determination can be made regarding whether the internal combustion engine should be operated or stopped, from a standpoint of reducing consumption of paid energy in the system.

The determining means may be adapted to determine that the engine should be used to realize a requested driving force, when the requested driving force cannot be realized by the motor-generator alone. Under the conditions where the rotary electric machine alone cannot realize a driving force, the sole use of the internal combustion engine for realizing the driving force generally tends to reduce the consumption of the paid energy. Therefore, under such conditions, it is determined in the above invention that a requested driving force is realized by the internal combustion engine.

It is preferred that the two or more functional device units include an internal combustion engine and a rotary electric machine as on-vehicle main engines, a first heating means intended to heat the vehicle interior using the waste-heat of the internal combustion engine, and a second heating means including a heat-pump. In this configuration, there are two or more functional device units for realizing heating of the vehicle interior. Also, the input energy forms of the two or more functional device units are different from each other. Therefore, it is difficult to determine which use of the functional device units can reduce the consumption of the paid energy resource, by comparing the input quantity between the functional device units. In addition, the input energy forms of the functional device units for realizing a driving force are also different from each other. Therefore, when there is a driving request, it is also difficult to determine which use of the functional device units can reduce the consumption of the paid energy resource, by comparing the input quantity between the functional device units. Further, the first heating means for realizing heating of the vehicle interior uses the output of the internal combustion engine. This makes the determination more difficult regarding which of the functional device units to use for the realization of both the heating and driving requests, to reduce the consumption of the paid energy resource. Thus, the normalizing means has a particularly great potential.

The determining means may be adapted to determine which of the first heating means and the second heating means should be used, based on the direct comparison between a cost for the case where the efficiency of the internal combustion engine is lowered and thus the waste heat is increased and a cost for the case where the second heating means is used.

The determining means may also be adapted to calculate a cost for the case where the first heating means is used assuming that the internal combustion engine is in a quasi-stationary operating state, while the internal combustion engine is stopped.

In the above configurations, the cost is calculated assuming that the internal combustion engine is in a quasi-stationary operating state. Thus, the cost can be easily calculated without the necessity of considering the transition state where warming up of the internal combustion engine is accelerated.

In addition, the determining means may be adapted to predict a continuous traveling period of the vehicle while the internal combustion engine is stopped, and then to, if the predicted period is equal to or less than a predetermined length, determine that only the second heating means should be used.

In a vehicle with a rotary electric machine, when the vehicle is stopped, the internal combustion engine is generally also brought into a stopped state. Accordingly, when the traveling period of the vehicle is short, the internal combustion engine will be stopped by the time it is warmed up. In this case, it is considered that the heat produced by the combustion of the internal combustion engine cannot be effectively used by the first heating means, and that this will not be an effective use of the paid energy resource. Therefore, in the above invention, the second heating means alone is selected when a predicted continuous traveling period of the vehicle is short, without using the internal combustion engine.

It is preferred that the apparatus includes a priority determining means for determining whether or not there is any request having a higher priority than the reduction of the cost for the system; and a prohibiting means for if it determined by the priority determining means that there is a request having a higher priority than the reduction of the cost, prohibiting assignment of a usage ratio to a functional device unit against the detected higher priority request. In the above invention, when there is a request having a higher priority than the reduction of the cost, the request can be properly dealt with.

The determining means is further adapted to determine to which of the functional device units the charge-free energy should be fed such that the cost consumed by the system can be reduced. The predetermined quantity of energy is charge-free energy, for example.

The determining means may further be adapted to through determination of into which of output energy forms of the two or more functional device units having different functions the charge-free energy should be preferentially converted, feed the charge-free energy to a functional device unit whose input is given by the determined output energy form.

As an example, the determining means includes a conversion quantity calculating means for calculating a conversion quantity when the predetermined charge-free energy is converted into each of the output energy forms of the two or more functional device units having different functions; a compensation cost calculating means for by using the normalizing means, for each of the output energy forms of the two or more functional device units having different functions, calculating a cost incurred in compensating the conversion quantity by energy other than the predetermined charge-free energy; and a priority assigning means for assigning a higher priority to the output energy form into which the predetermined charge-free energy is converted with a larger compensation cost.

When charge-free energy is not converted into an output energy form having a large compensation cost, the paid energy resource consumed by the system will be increased compared to the case where conversion has been conducted. Therefore, use of the priority assigning means can contribute to determining a destination of feeding the charge-free energy such that the consumption of a paid energy resource of the system can be reduced.

By way of example, in this configuration, the determining means includes an average cost calculating means for calculating an average cost of output energy of the functional device units having a similar function, based on the history of the quantity of the paid energy resource required for producing every unit quantity of energy, for each of the functional device units having the similar function, and the compensation cost calculating means is adapted to calculate the cost incurred in compensating, based on the calculated average cost. In this case, the compensation cost can be calculated based on the trend in the past regarding the consumption of the paid energy resource in producing output energy.

By way of another example, the normalizing means includes: a first defining means for, by using the conversion means in converting the charge-free energy into output energy of the functional device units, defining a restricted usage cost that is the cost required for converting energy other than the charge-free energy into output energy of the present functional device unit; and a second defining means for defining an average cost for output energy for each of the functional device units having a similar function, wherein the determining means includes a priority assigning means for assigning a higher priority to the output energy form into which the predetermined charge-free energy is converted, with a smaller ratio of the restricted usage cost to the average cost.

When the ratio of an average cost to a restricted usage cost is large, the cost incurred in producing the energy of the output energy form is considered to be usually large. Therefore, it may be effective to convert charge-free energy into the output energy having a large ratio of the average cost, in order to reduce the consumption of a paid energy resource. The determining means has been configured in the above invention, taking this into account.

The determining means may includes a second determining means for determining whether or not there is any functional device unit undesirable to use in satisfying an external request, among the two or more functional device units; and a removing means for if it determined that there is such an undesirable functional device unit, removing the undesirable functional device unit from the candidate destinations of feeding the charge-free energy. When a certain functional device units is not desired to be used at present, feeding charge-free energy to the functional device units concerned may raise a problem even when the compensation cost of the functional device units concerned is large. Therefore, such a functional device unit concerned is removed, in the above invention, from the candidate destinations of feeding charge-free energy.

Furthermore, the system includes a vehicle system, and the charge-free energy includes energy extracted from the drive wheels during deceleration of the vehicle, the two or more functional device units include a charging means that charges electric power and discharging the power to the exterior, and an on-vehicle air conditioning means that includes a compressor driven by application of torque.

In the apparatus, by way of example, the system comprises a vehicle system equipped with an internal combustion engine, the charge-free energy includes waste-heat energy from the internal combustion engine, and the two or more functional device units include a heating means for heating the vehicle interior using the waste heat and a generating means for performing electric power generation using the waste heat.

In the apparatus, for another example, the system includes a system installed in a residential building, wherein the charge-free energy includes solar-generated energy, and the two or more functional device units include a supplying means for supplying the solar-generated energy to an electric power company and a converting means for converting the solar-generated energy into thermal energy.

In the example, the system may include a functional device unit installed in a vehicle and a functional device unit installed in a residential building, and the determining means is adapted to let one of the candidates for receiving the charge-free energy output from the functional device unit installed in the residential building be a charging means for the vehicle.

By way of example, the normalizing means is adapted to calculate the cost incurred in producing output energy of at least one functional device unit by referring to the history of the paid resource quantity required for producing every output energy of the at least one functional device unit. When the cost incurred in producing output energy varies, the history of the cost is considered to include information regarding the trend of variation. In the above invention, the cost incurred in producing the output energy can be quantified with high accuracy by referring to the history, even when the cost varies every time the output energy is produced.

Additionally, the normalizing means may be adapted to calculate the cost estimated to be incurred in producing every output energy of at least one functional device unit, based on future prediction information of the environments where the at least one functional device unit is situated. One of the factors causing variation in the cost incurred in producing the output energy may be the variation of the environment where the functional device units that output the output energy is situated. Therefore, the future prediction information is used in the above invention to highly accurately quantify the cost estimated to be incurred in producing the output energy.

The apparatus may include the two or more functional device units including a functional device unit that uses a paid energy resource as a direct energy source and a functional device unit that uses the output of the former functional device unit as a direct energy source. When there is a functional device unit that uses a paid energy resource as a direct energy source and a functional device unit that uses the output of the former functional device units as a direct energy source, it may be particularly difficult to calculate the quantity of the paid energy resource consumed by the latter functional device units by the input. Thus, the normalizing means has a particularly great potential.

The system may include both a functional device unit installed in a vehicle and a functional device unit installed in a residential building.

DETAILED DESCRIPTION OF THE PREFERRED EMBODIMENTS

With reference to the accompanying drawings, hereinafter are described several embodiments of an energy management apparatus of the present invention.

First Embodiment

First, referring to FIGS. 1 to 6, hereinafter is described an energy management apparatus according to a first embodiment of the present invention. In the first embodiment, the energy management apparatus is applied to a parallel-hybrid vehicle.

Figure 1:
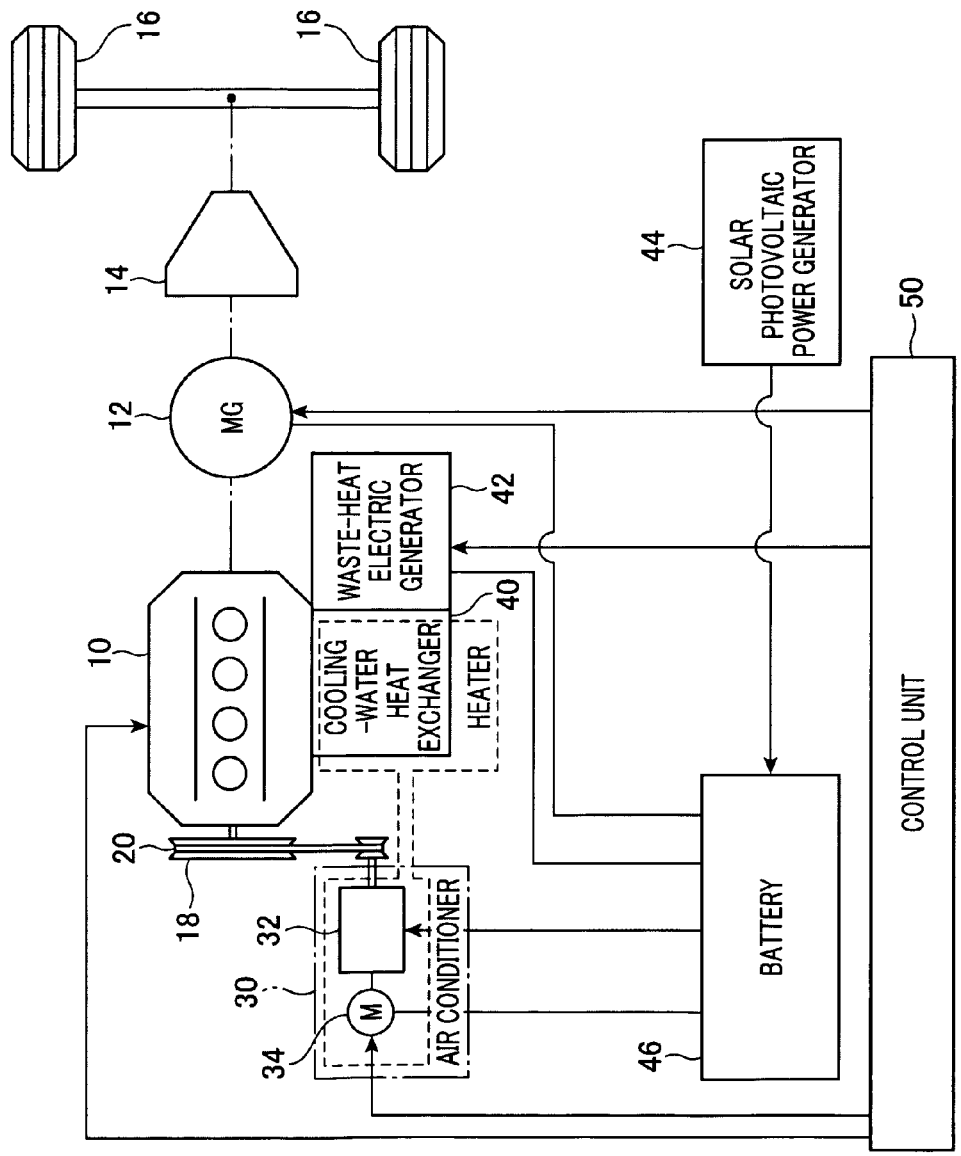
FIG. 1 is a schematic diagram of an energy management apparatus according to a first embodiment of the present invention.

FIG. 1 is a schematic diagram illustrating the energy management apparatus according to the first embodiment. As shown in FIG. 1, the energy management apparatus includes an engine 10, motor-generator 12, transmission 14, drive wheels 16, pulley 18, belt 20, on-vehicle air conditioner 30, compressor 32, motor 34, cooling-water heat exchanger 40 (hereinafter just referred to as "heat exchanger 40"), waste-heat electric generator 42, solar photovoltaic power generator 40, battery 46 and control unit 50.

The engine 10 is an internal combustion engine that functions as an on-vehicle main engine. The engine 10 has a rotary shaft (crank shaft) which is directly connected to a rotary shaft of the motor-generator 12. The motor-generator 12 also functions as an on-vehicle main engine. The rotary shaft of the motor-generator 12 is connected to the drive wheels 16 via the transmission 14.

The torque of the engine 10 is able to give a motive power to a driven shaft of the compressor 32 of the air conditioner 30 via the pulley 18 and the belt 20. The compressor 32 is of a variable capacity type. The compressor 32 is of an engine driven type driven by the engine 10, and at the same time is of an electric driven type driven by the motor 34. The compressor 32 here also has a function of a heat pump. In other words, the air conditioner 30 has a function of performing both cooling and heating of the vehicle interior. An air conditioner having such a function as the air conditioner 30 is disclosed, for example, in JP-A-2002-370529.

The engine 10 is provided in its vicinity with the heat exchanger 40 that exchanges heat with the cooling water of the engine 10. The heat exchanger 40 is provided in its vicinity with the waste-heat electric generator 42 that performs electric power generation using the waste heat of the engine 10. Specifically, the waste-heat electric generator 42 is a means that converts the heat energy outputted from the heat exchanger 40 into electric power. Meanwhile, the heat exchanger 40 is not only a means that supplies heat energy to the waste-heat electric generator 42, but also a means that uses heat energy to heat the vehicle interior.

The solar photovoltaic power generator 44 is a means that receives solar energy for conversion into electric energy. The battery 46 is a power storage means that has a function of storing inputted electric energy and outputting the stored electric energy. The battery 46 actually consists of a plurality of batteries, such as a low-voltage battery that supplies electric energy to the on-vehicle auxiliary machinery, such as the motor 34, and a high-voltage battery that supplies electric energy to the motor-generator 12.

The control unit 50 is a controlling means that controls various functional device units, such as the engine 10, the motor-generator 12 and the motor 34, shown in FIG. 1.

Figure 2:
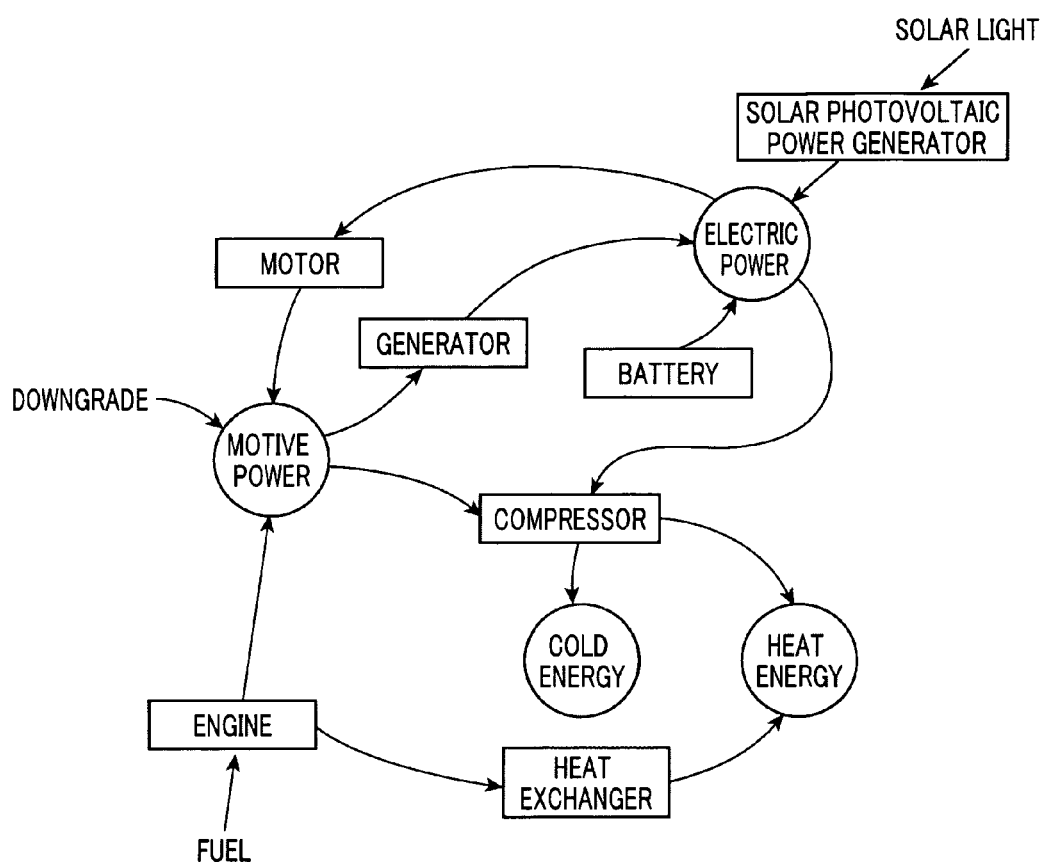
FIG. 2 is a diagram illustrating flows of energy in the system.

FIG. 2 is a diagram illustrating flows of energy between the various functional device units of the energy management apparatus. As shown in FIG. 2, the system has various functional device units including a functional device unit that generates driving force of the vehicle, a functional device unit that stores electric energy and outputs the stored electric energy, a functional device unit that heats the vehicle interior, and a functional device unit that cools the vehicle interior. The present embodiment, in particular, has characteristics of having two or more functional device units that generate a driving force of the vehicle, and two or more functional device units that heat the vehicle interior. In this case, both the engine 10 and the motor-generator 12 serve as a functional device unit that generates the driving force of the vehicle, while both the compressor 32 and the heat exchanger 40 serve as a functional device unit that heats the vehicle interior. The term "functional device unit" can be said as units which used to classify functional devices functionally realizing the same purpose and can frequently be described in the same manner as that for hardware devices.

An issue in this case is which of the functional device units should be selected to satisfy an external request. Specifically, if there is a request for generating driving force for the vehicle, selection of either of the engine 10 and the motor-generator 12 will be an issue because both of them are usable as functional device units for satisfying the request. Similarly, if there is a request for heating the vehicle interior, selection of either of the compressor 32 and the heat exchanger 40 will be an issue because both of them are usable as functional device units for satisfying the request.

Under such conditions, it is desirable to make a selection that will reduce energy consumption in the system. For example, solar-generated energy and torque given to the drive wheels 16 on a downgrade are basically charge-free energy. Regarding solar photovoltaic power generation, it is true that initial investment is required for the solar photovoltaic power generator 44, but an issue intended to be discussed here concerns with paid energy resources associated with an already completed system. In this regard, it will be understood that the only paid energy resource in the system of the present embodiment is fuel which is converted to combustion energy by the engine 10. However, it is not easy to make a selection for reducing consumption of this paid energy resource in the system.

The cause of this difficulty lies in the difference in the input form between these similar functional device units in realizing the required function. For example, if driving force is defined in terms of power, the quantity of requested power is the same between the engine 10 and the motor-generator 12. However, what is needed for realizing the requested power is fuel for the engine 10 and electric energy for the motor-generator 12. Thus, the form of energy to be used is different between the engine 10 and the motor-generator 12. In addition, what makes matters more complicated is the potential variation in the quantity of electric energy and fuel per unit power.

The same applies to the case where there is a request of heating the vehicle interior. In this case, it is difficult to make a determination which of the compressor 32 and the heat exchanger 40 can reduce consumption of the paid energy resource in the system, because of the difference in the input energy form. In addition, what makes matters more complicated is that the heat exchanger 40 directly uses the energy produced from the use of a different functional device unit (the waste heat generated by the operation of the engine 10).

Therefore, in the present embodiment, the input energy in realizing the function of each of the functional device units is quantified in terms of the cost of the paid energy resource (fuel) required in realizing the function. This quantification can determine which use of the functional device units can reduce fuel consumption.

Figure 3:
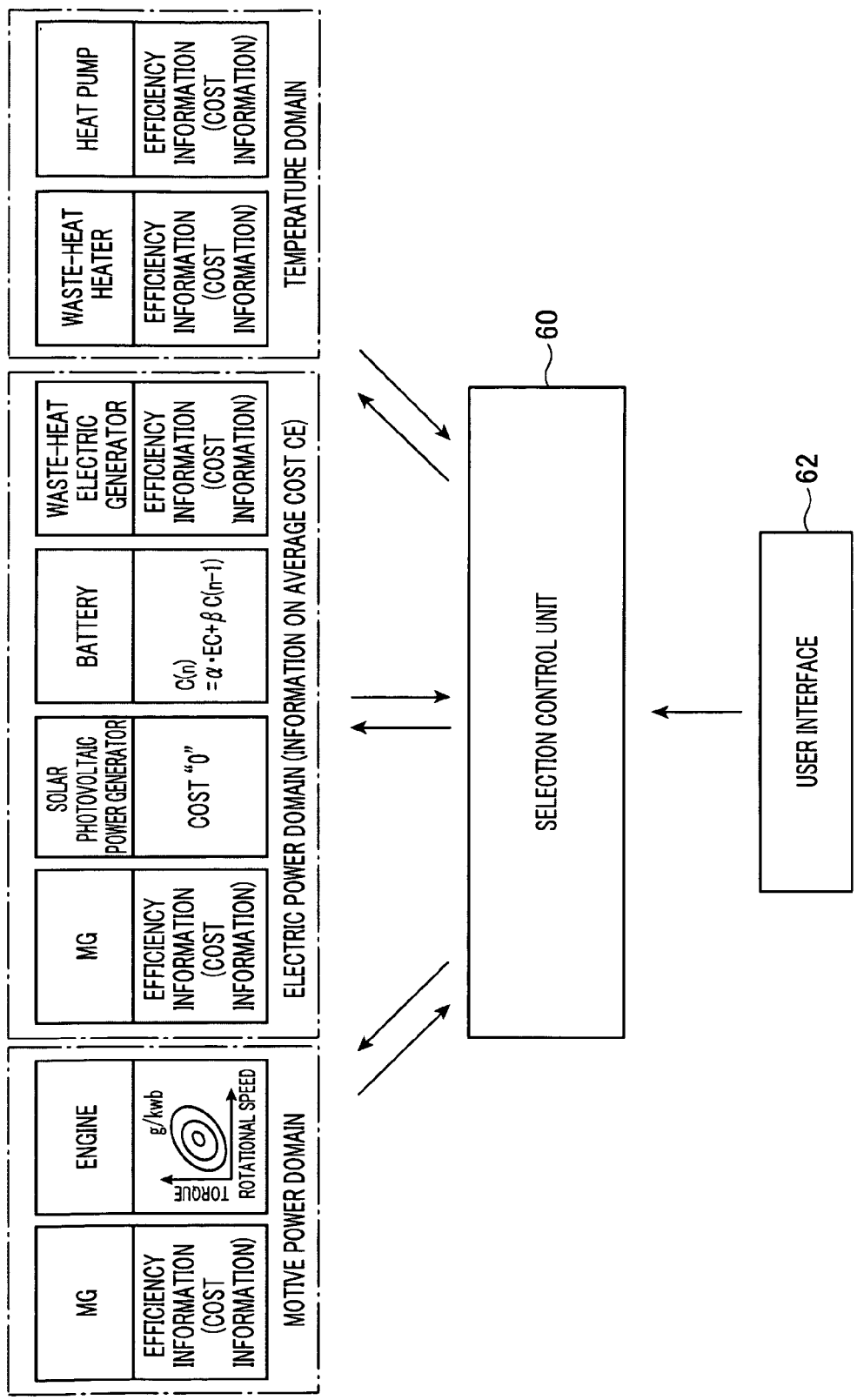
FIG. 3 is a block diagram illustrating processes associated with energy management in the system.

FIG. 3 is a block diagram illustrating the processes particularly associated with the control of energy supply to the two or more functional device units in the management system, among the processes performed by the control unit 50.

As shown in FIG. 3, the control unit 50 memorizes the functional device units (engine 10, motor-generator 12, solar photovoltaic power generator 44, battery 46, waste-heat electric generator 42, waste-heat heater (the heat exchanger 40 as a heater) and heat pump) by classifying them into a motive power domain, an electric power domain and a temperature domain. The term "domain" here refers to a group of functional device units classified on a functional basis. In other words, the term "domain" here refers a group of functional device units classified based on the output energy forms.

Specifically, the engine 10 and the motor-generator 12 both output driving force (rotational energy) of the vehicle. Accordingly, both of these functional device units are classified into the same domain (motive power domain). Also, the solar photovoltaic power generator 44, the battery 46 and waste-heat electric generator 42 all output electric energy. Accordingly, all of these functional device units are classified into the same domain (electric power domain). The motor-generator 12 also belongs to the electric power domain when it functions as a generator outputting electric energy. Further, the waste-heat heater and the heat pump both output heat energy and thus are classified into the same domain (temperature domain).

The functional device units set forth above are correlated to the information for calculating fuel quantity required for realizing the individual functions. The information correlated to the engine 10 includes the information on fuel consumption per unit quantity of energy. It is not that only one value of fuel consumption per unit quantity of energy is stored for each torque intensity and rotational speed, but that a plurality of values are stored for each torque intensity and rotational speed, according to different operations of the engine 10. For example, when the engine 10 is a spark ignition engine, such as a gasoline engine, a value for fuel consumption per unit quantity of energy is stored for each value of efficiency that changes depending on the ignition timing. Further, in addition to the information on the fuel consumption per unit quantity of energy (efficiency information), the information correlated to the engine 10 includes information on the fuel consumption per unit output per unit time (cost information) which is calculated based on the efficiency information every time the efficiency information is obtained.

The information correlated to the motor-generator 12, when it belongs to the motive power domain, includes information on the required electric power for every torque intensity and rotational speed. The required electric power may be a product of torque and rotational speed, or may be a value smaller than the product, taking account of the loss in converting input energy into output energy. Also, in addition to the information on the required electric power (efficiency information), the information correlated to the motor-generator 12 may include information on fuel consumption per unit output per unit time (cost information) calculated from the efficiency information every time the efficiency information is obtained.

The information correlated to the motor-generator 12, when it belongs to the electric power domain, includes information on generation efficiency set for every torque intensity and rotational speed, as well as information on fuel consumption per unit output per unit time (cost information) calculated from the efficiency information every time the efficiency information is obtained.

The information correlated to the solar photovoltaic power generator 44 includes cost information, i.e. unit cost is "0 g/kWh".

The information correlated to the waste-heat electric generator 42 includes efficiency information in converting the waste heat of the engine 10 into electric energy. For example, details of calculating electric energy from waste heat are described in JP-A-2007-100687. In addition to the efficiency information, the information correlated to the waste-heat electric generator 42 includes cost information calculated from the efficiency information every time the efficiency information is obtained. The cost information corresponds to the information concerning the increase of operation cost (difference cost) of the engine 10 accompanying waste-heat electric generation.

The information correlated to the waste-heat heater includes efficiency information in converting required heating into input energy (the required heating here is quantified in terms of electric power). In addition to the efficiency information, the information correlated to the waste-heat heater includes cost information calculated from the efficiency information every time the efficiency information is obtained. The cost information corresponds to the information concerning the increase of operation cost (difference cost) of the engine 10 accompanying waste-heat heating.

The information correlated to the heat pump includes efficiency information in converting requested heating into input energy. In addition to the efficiency information, the information correlated to the heat pump includes cost information calculated from the efficiency information every time the efficiency information is obtained.

Figure 4:
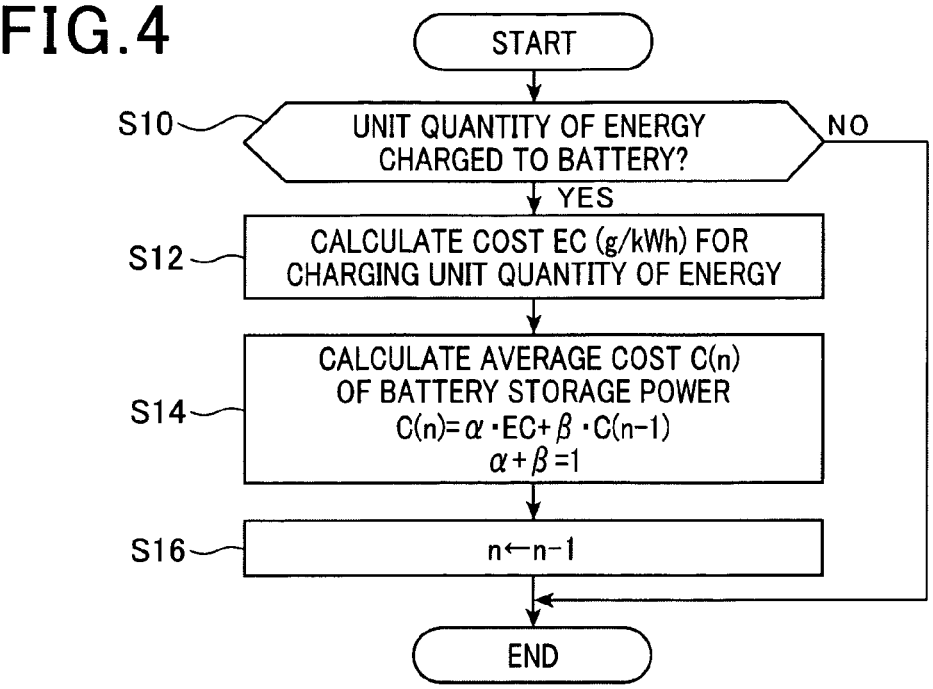
FIG. 4 is a flow diagram illustrating a procedure of calculating an average cost of electric power stored in a battery, according to the first embodiment.

The information correlated to the battery 46 includes information on fuel quantity required for producing a unit quantity of stored electric energy (information on average cost C). In the present embodiment, the average cost C is quantified based on the history of fuel quantity required for charging every unit quantity of electric energy. FIG. 4 is a flow diagram illustrating a procedure of calculating the average cost C of this time. For example, this procedure is repeatedly executed at a predetermined cycle.

In a series of processes in the procedure, it is determined, at step S10, whether or not a unit quantity of electric energy has been newly charged to the battery 46. If an affirmative determination is made at step S10, control proceeds to step S12 where the fuel quantity (unit cost EC (g/kWh)) required for charging the unit quantity of electric energy is calculated. This unit cost EC corresponds to an average cost of the electric power domain during the period when a unit quantity of electric energy is newly charged to the battery 46. For example, in the case where electric generation of the motor-generator 12 is started during the operation of the engine 10, the unit cost EC corresponds to the fuel quantity (difference cost) required for the engine 10 per unit generation, which has been increased by the electric generation. For example, let us assume that the powers of the engine 10 before and after starting the electric generation are 3 kW and 8 kW, respectively, and that the unit costs and generation efficiency retrieved for these powers based on the efficiency information are 200 g/kWh, 150 g/kWh and 80%. In this case, the unit cost EC can be expressed as follows:

$$8\ kW \times 150\ g/kWh - 3\ kW \times 200\ g/kWh)/\{(8\ kW - 3\ kW) \times 0.8\} = 150\ g/kWh$$

However, under the conditions where the engine 10 is stopped and the motor-generator 12 is in operation and where electric generation is conducted by the motor-generator 12 by actuating the engine 10, the unit cost EC is calculated as an increase of the cost incurred in actuating the engine 10, with respect to the cost incurred in the traveling using the motor-generator 12. For example, when the average cost C is 120 g/kWh, the unit cost EC required by the motor-generator 12 is 3 kW×120 g/kWh. The unit cost EC in this case incurred in electric generation can be expressed as follows:

$$(8\ kW \times 150\ g/kWh - 3\ kW \times 200\ g/kWh)/\{(8\ kW - 3\ kW) \times 0.8\} = 210\ g/kWh$$

In this way, when functional device units to be used are changed depending on the charging request to the battery 46, the unit cost EC is calculated in accordance with the increase of the cost before and after the change. Thus, the average cost C (n) ("n" is a parameter that specifies the n-th sample) of the battery 46 can be a value more appropriate as the cost required for charging the electric energy.

The cost incurred in charging a unit quantity of energy by the waste-heat electric generator 42 may be calculated in a manner described in JP-A-2007-100687 mentioned above. Also, the cost incurred in charging a unit quantity of energy by the solar photovoltaic power generator 44 is 0 g/kWh. By contrast, when electric generation is conducted by the waste-heat electric generator 42 or the solar photovoltaic power generator 44 in addition to the electric generation conducted by the motor-generator 12, the average cost incurred in producing a unit quantity of energy by the waste-heat electric generator 42 or the solar photovoltaic power generator 44 corresponds to the unit cost EC. For example, when the electric generation by the motor-generator 12 is 4 kW and the cost of electric generation is 210/kWh, and the electric generation by the waste-heat electric generator 42 is 1 kW and the cost of electric generation is 0 g/kWh, the unit cost EC is calculated as follows:

(210 g/kWh×4 kW+0 g/kWh×1 kW)/(4 kW+1 kW)=168 g/kWh

At the subsequent step S14, the average cost C (n) of the stored electric power of the battery 46 is calculated. In the present embodiment, the average cost C (n) based on the history of the fuel quantity required for producing a unit quantity of energy is quantified using an exponential moving average process. Specifically, the fuel quantity required for producing a unit quantity of energy this time (unit cost EC) and the previous average cost C (n−1) are multiplied by coefficients "α" and "β" (α+β=1), respectively. Then, the resultant values are added to obtain the average cost C (n). Thus, the influence of the fuel quantity required for producing the electric energy charged by a predetermined quantity or more in the past can be attenuated in a preferred manner. Therefore, the average cost C (n) can be quantified by the fuel quantity required for producing the electric energy charged in a period close to the present. The average cost C quantified in this way may appropriately express the cost incurred in outputting a unit quantity of energy from the battery 46. When the process at step S14 is completed, control proceeds to step S16 where the parameter "n" that specifies a sampling value of this time is rendered to be "n−1", and then the series of processes is temporarily ended.

Of the three domains mentioned above, the electric power domain that is a domain corresponding to an input energy form of any of the functional device units, stores information on the average cost CE of the domain as shown in FIG. 3. The average cost CE of the electric power domain is calculated based on the history of the fuel quantity required for producing each unit quantity of output energy, in a manner shown in FIG. 4. Specifically, the calculation may be conducted using a moving average process for the cost incurred in producing each unit quantity of energy in the electric power domain, irrespective of the occurrence of charging of the battery 46. The difference between the cost incurred in producing each unit quantity of energy and the unit cost EC is that the former is seasoned with the cost of output electric energy of the battery 46.

Figure 5:
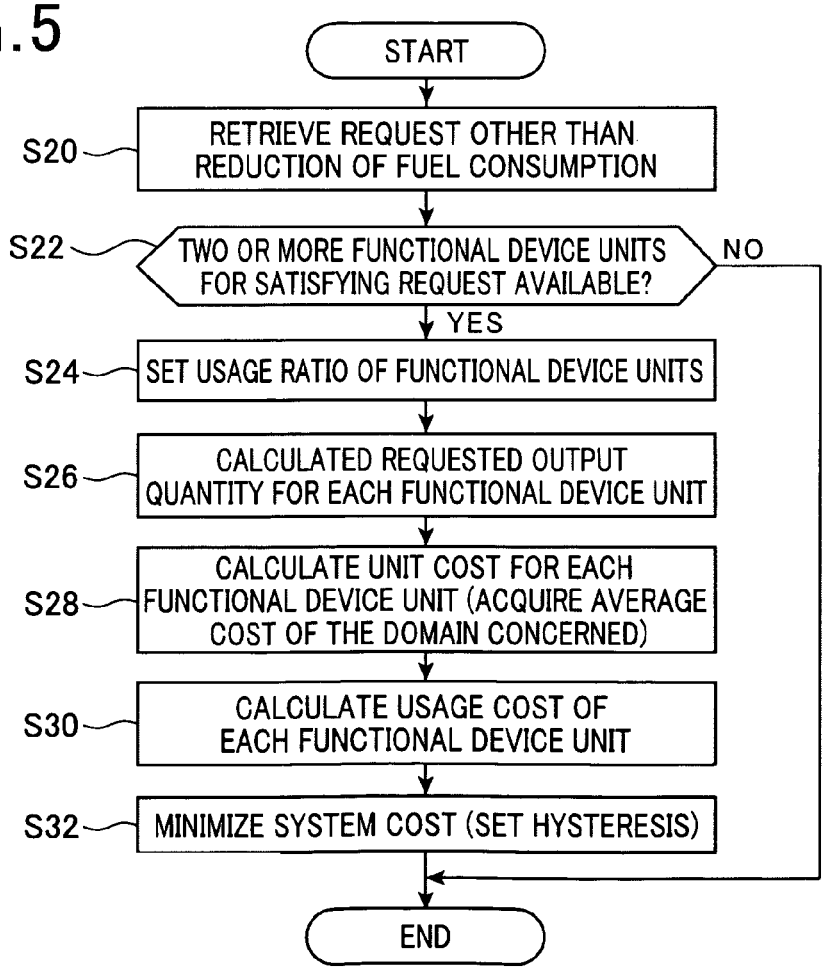
FIG. 5 is a flow diagram illustrating a procedure of selecting a functional device unit, according to the first embodiment.

In a selection control unit 60 shown in FIG. 3, a usage ratio of a functional device unit is determined based on a request retrieved from a user interface 62. FIG. 5 shows the processes performed by the selection control unit 60. For example, these processes are repeatedly performed at a predetermined cycle.

In a series of these processes, requests other than reducing fuel consumption are retrieved at step S20. Such requests include, for example, a request for reducing vehicle noise near home as much as possible. In such a case, the vehicle is permitted to travel with the motor-generator 12, being inhibited to travel with the engine 10. At the subsequent step S22, it is determined whether or not there are two or more functional device units for satisfying the request. This process is performed based on the results of the retrieval performed at step S20. For example, under the conditions where the vehicle is inhibited from traveling with the engine 10 and there is a request for heating the vehicle interior, the heat pump can serve as the functional device units for satisfying the request. However, the waste-heat heater in this case will not serve as the functional device units for satisfying the request.

When it is determined that there are two or more functional device units having a similar function, a usage ratio is set, at step S24, for each of the two or more functional device units for satisfying the request. For example, in addition to the usage ratios of the sole waste-heat heater and the sole heat pump, a usage ratio is set for both the waste-heat heater and the heat pump in cooperative use for satisfying a heating request. Also, for example, in addition to the usage ratios of the sole engine 10 and the sole motor-generator 12, a usage ratio is set for both the engine 10 and the motor-generator 12 in cooperative use for satisfying a driving request.

At the subsequent step S26, a requested input quantity is calculated for each functional device unit according to the set usage ratio. Then, at step S28, a unit cost is calculated for each functional device unit. When the input energy form of a functional device unit whose unit cost is to be calculated is electric energy, the average cost CE is used as the unit cost. Therefore, unit cost information is retrieved and acquired at step S28. For example, when a functional device unit is the heat pump, the input energy form is electric energy that belongs to the electric power domain. Accordingly, the average cost CE for this is acquired at step S28. Further, at step S30, a cost (usage cost) is calculated according to the requested input quantity that has been calculated at step S26. Then, at step S32, a process of minimizing the system cost is performed.

Hereinafter, the processes at steps S24 to S32 are explained, taking as an example the case where there are requests for driving the vehicle and for heating the vehicle interior. In this case, usage ratio patterns set at step S24 include: pattern (a): usage ratio of the engine 10 and the waste-heat heater is set to 100%; pattern (b): the engine 10, the waste-heat heater and the heat pump are used; pattern (c): the engine 10, the motor-generator 12 and the heat pump are used; and pattern (d): the motor-generator 12 and the heat pump are used. Examples of calculating the usage cost in these patterns are set forth below.

Pattern (a): usage ratio of the engine 10 and the waste-heat heater is set to 100%:

Let us assume that the driving power of the engine 10 is 3 kW and the unit cost then is calculated to be 200 g/kWh, based on the efficiency information mentioned above. In this case, the operation cost of the engine 10 is calculated to be 600 g/h. If the heat required by the waste-heat heater can be sufficiently supplied by the waste heat of the engine 10, the fuel consumption (cost) per unit time of the waste-heat heater is calculated to be zero. This determination may be made based on the efficiency information of the waste-heat heater. In other words, if the heat energy required by the waste-heat heater is determined to be equal to or less than the heat energy obtained from the engine 10, based on the efficiency information of the waste-heat heater, it is determined that the requested heating can be sufficiently supplied by the engine 10 currently in operation.

If the requested heating is large in quantity and thus the engine 10 in a high-efficiency operation cannot supply the waste heat sufficient for realizing the requested heating performance, a cost is calculated for the case where the efficiency of the engine 10 is lowered and the heating request is satisfied by the waste-heat heater alone.

The cost calculation for the case where the efficiency of the engine 10 is lowered is specifically described in W-A-2007-100687, for example. For example, when the requested input energy is calculated from the efficiency information of the waste-heat heater, the unit cost of the engine 10 corresponding to the resultant value is retrieved from the efficiency information. If the unit cost is 230 g/kWh, the total cost incurred in the efficiency of the engine 10 and the waste-heat heater is calculated to be "230 g/kWh×3 kWh=690 g/h". In fact, the difference cost (30 g/kWh×3 kW) before and after lowering the efficiency of the engine 10 is calculated as the cost information correlated to the waste-heat heater shown in FIG. 3.

Pattern (b): the engine 10, the waste-heat heater and the heat pump are used:

In this case, an input electric power is calculated for the case where insufficiency of the waste-heat heater is compensated by the heat pump, based on the efficiency information. Then, the resultant input electric power is multiplied by the average cost CE of the electric power domain to calculate the cost that will be incurred in the heat pump. For example, let us assume that the input electric power is 500 W and the average cost CE is 120 g/kWh. In this case, the cost incurred in the heat pump will be "500 W×120 g/kWh=60 g/h". With the addition of the operation cost "600 g/h" of the engine 10, the total cost incurred in the efficiency of the engine 10, the waste-heat heater and the heat pump is calculated to be 660 g/h. It is desirable that the pattern (b) is used when the waste-heat heater alone cannot satisfy the heating request when the engine 10 is operated in the state of as much a high efficiency as possible.

Pattern (c): the engine 10, the motor-generator 12 and the heat pump are used:

For example, let us assume that a requested driving force for the engine 10 is set to 2 kW, and a requested driving force for the motor-generator 12 is set to 1 kW. Let us assume further, in this case, that the unit cost for the engine 10 retrieved from the efficiency information is 200 g/kWh and the average cost CE of the electric power domain is 120 g/kWh. In this case, the cost incurred in the driving force will be "200 g/kWh×2 kW+120 g/kWh×1 kW=520 g/h". In this case, if the electric power requested by the heat pump is 500 W, the cost will be "500 W×120 g/kWh=60 g/h". Accordingly, the total cost will be "520 g/h+60 g/h=580 g/h".

Pattern (d): the motor-generator 12 and the heat pump are used:

When a requested driving force is 3 kW and a requested electric power for the heat pump is 3 kW, the total cost incurred in satisfying the driving request by the motor-generator 12 alone is "3 kW×120 g/kWh+3 kW×120 g/kWh=720 g/h".

Even when the motor-generator 12 alone is to satisfy a driving request, if the engine 10 is in an idling mode with the waste-heat heater being in use, the fuel consumption per unit time (e.g., 900 g/h) in the idling mode may be regarded to be the cost incurred in the waste-heat heater.

After the calculation, at step S24, of the total cost in each of the set usage ratio patterns, control proceeds to step S32 where a usage ratio pattern that can minimize the cost is selected. In the example set forth above, the pattern (c) is selected. When the total cost of the selected pattern becomes no longer the minimum cost as time goes on, immediate change of selection may likely to cause a hunting phenomenon in which change of selection is frequently performed. Therefore, a hysteresis is set in the conditions of changing selection. For example, a hysteresis is set by subtracting a predetermined quantity from the total cost resulting from the pattern that is currently selected, for comparison with the total costs resulting from other patterns.

Usage ratio may not be necessarily determined for all of the above patterns (a) to (d). For example, when there is a heating request, usage ratio may be determined for two patterns, i.e. sole use of the waste-heat heater and sole use of the heat pump.

Figure 6:
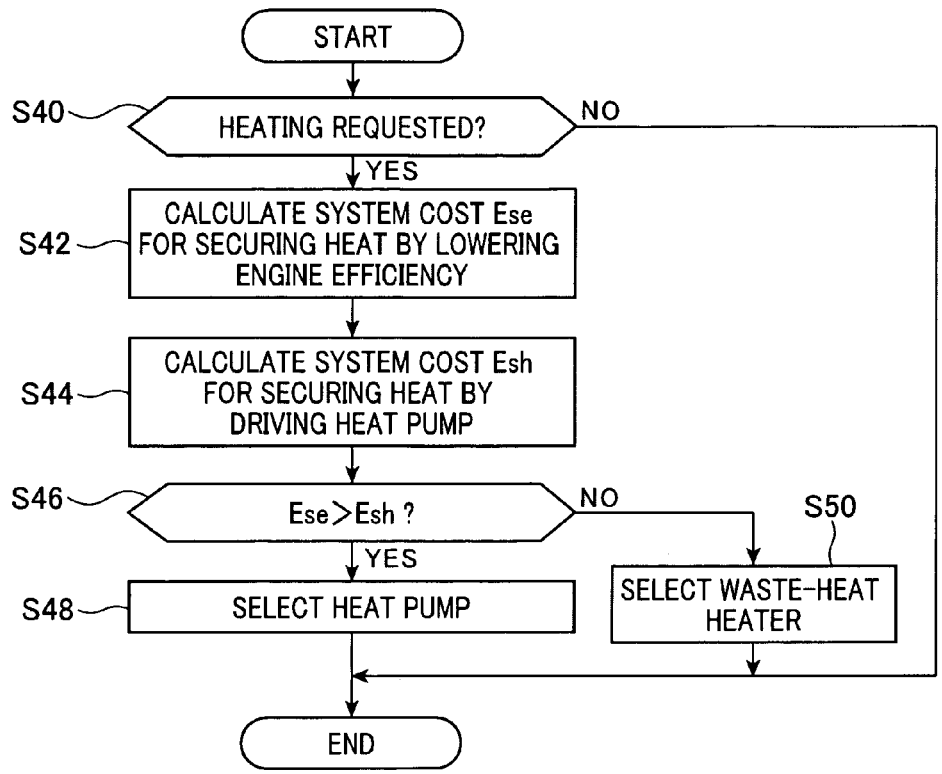
FIG. 6 is a flow diagram illustrating a procedure in the case where the above selection procedure is applied to the selection between a waste-heat heater and a heat pump.

FIG. 6 shows an example of a procedure of the processes performed in such a case. This procedure is a specific example of the processes shown in FIG. 5.

Specifically, when it is determined that there is a heating request (Yes at step S40), control proceeds to step S42. At step S42, a system cost Ese in the case where the request is satisfied by the waste-heat heater alone is calculated in a manner of the above pattern (a). Then, at step S44, a system cost Esh in the case where the heating request is satisfied by the heat pump alone is calculated. Then, if the system cost Ese in the sole use of the waste-heat heater is larger than the system cost Esh in the sole use of the heat pump (Yes at step S46), the heat pump is selected (step S48). Otherwise (No at step S46), the waste-heat heater is selected (step S50). The selection process at step S46 is indicated in a simplified manner. Practically, however, it is desirable that a hysteresis mentioned above may be set when a selection is made.

According to the present embodiment described in detail so far, the following advantages may be obtained.

(1) Input energy of each functional device unit has been normalized in terms of the cost of the fuel, i.e. paid energy resource, required for producing the input energy. Thus, when there are two or more functional device units that realize a similar function, a functional device unit to be used can be determined from a view point that which use of the candidates for feeding energy can reduce the fuel consumption.

(2) The input required in using each functional device unit usable for satisfying an external request has been calculated, and then the cost for realizing the input has been calculated. Thus, when there are two or more similar functional device units, the fuel consumptions required for the system by using these respective functional device units can be compared with each other.

(3) A total cost incurred in the system can be estimated for the case where an external request is to be satisfied by the cooperative operation of two or more similar functional device units. Thus, fuel consumption of the system can be further reduced.

(4) The engine 10 and the motor-generator 12 have been included, as on-vehicle engines, in the two or more functional device units. These main engines have a difference in the direct input energy form. Accordingly, the fuel consumptions in the system cannot be compared by simply comparing the direct input energy forms. In this regard, the cost-basis (fuel consumption basis) normalization of the input to the functional device units has a particularly great deal of potential.

(5) The two or more functional device units have included a first heating means that heats the vehicle interior using the waste heat of the engine 10 and a second heating means provided with the heat pump. These heating means have a difference in the input energy form. In addition, since the first heating means uses the heat energy outputted from the engine 10, it has been difficult to determine which use of the functional device units can reduce the fuel consumption, when both the heating and driving requests are to be satisfied. In this regard, the cost-basis normalization of the input to the functional device units has a particularly great deal of potential.

(6) When there is a request having a higher priority than the reduction of the cost incurred in the system, the functional device units that perform against the request have been inhibited from being selected. Thus, such a request, if any, having a higher priority than the reduction of the cost can be appropriately dealt with.

(7) A certain functional device units may have an output energy form which is an input energy form for different functional device units. For each of such functional device units, the cost of the paid energy resource (average cost CE) incurred in producing the energy of the output energy form (electric energy) has been calculated, based on the history of the fuel quantity required for producing each unit quantity of energy. Thus, the cost incurred in producing the electric energy can be calculated with high accuracy even when each cost of the electric energy changes at every occurrence of energy output.

Second Embodiment

Figure 7:
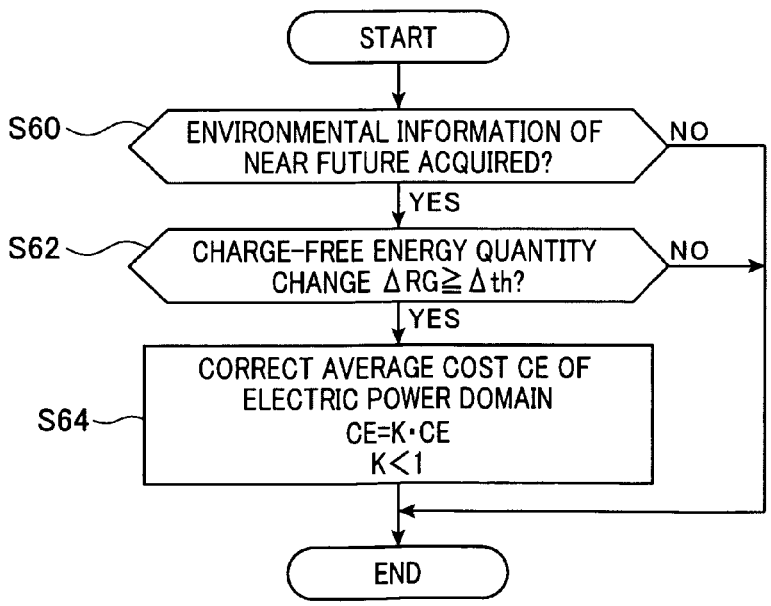
FIG. 7 is a flow diagram illustrating a procedure of correcting an average cost of the electric power stored in a battery, according to a second embodiment of the present invention.

With reference to FIG. 7, hereinafter will be described a second embodiment of the present invention, focusing on the differences from the first embodiment. It should be appreciated that, in the second and the subsequent various embodiments, the components identical with or similar to those in the first embodiment are given the same reference numerals for the sake of omitting explanation.

In the second embodiment, the average cost CE of the electric power domain is coupled with future prediction information of the environments where the vehicle concerned will be situated.

FIG. 7 shows a procedure of calculating the average cost CE, according to the present embodiment. For example, this procedure is repeatedly performed at a predetermined cycle.

In a series of processes in the procedure, it is determined, at step S60, whether or not environmental information of near future (e.g., future of several minutes to two hours later) is available. The environmental information may be available using, for example, a car navigation system and a road traffic information service system. For example, when a vehicle travels toward a destination with the destination being inputted to the car navigation system, the traveling route can be predicted assuming that the vehicle would travel along the designated route. Therefore, the traveling environments can be predicted using the road traffic information service system.

If it is determined that the environmental information is available, control proceeds to step S62. At step S62, it is determined whether or not a change ΔRG in the quantity of charge-free energy is larger than a threshold Δth. This process is performed to determine whether or not the cost incurred in producing electric energy in the near future would be greatly reduced. For example, when the vehicle is traveling through a tunnel, and when solar photovoltaic power generation can be expected to be performed after passing through the tunnel, the quantity of charge-free energy available at that later time is considered to increase significantly. If an affirmative determination is made at step S62, control proceeds to step S64 where the average cost CE is corrected so that the cost will be reduced.

When the process at step S64 is completed or if a negative determination is made at step S60 or S62, the series of processes is temporarily ended.

According to the second embodiment described above, further advantage as set forth below can be obtained in addition to the advantages (1) to (7) of the first embodiment.

(8) The average cost CE of the electric power domain in the second embodiment has been calculated based on the future prediction information of the environments where the vehicle system is situated. Thus, the average cost CE can be calculated reflecting the cost that will be incurred in using the electric energy in the future.

Third Embodiment

Figure 8:
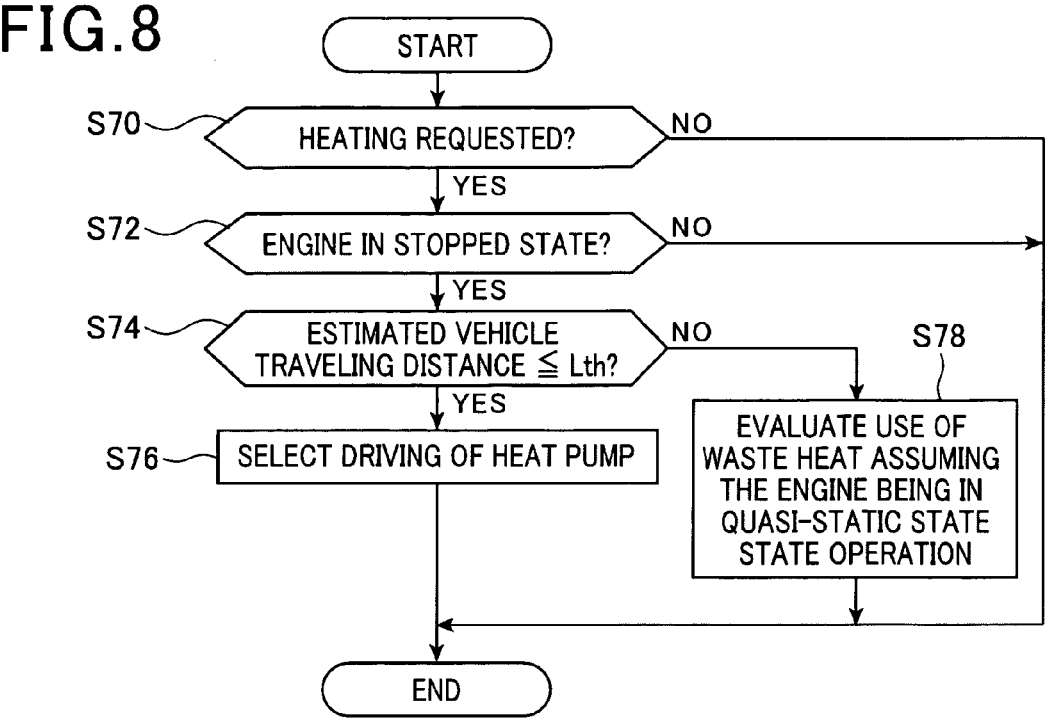
FIG. 8 is a flow diagram illustrating a part of a procedure of making a selection between a heat pump and a waste-heat heater, according to a third embodiment of the present invention.

With reference to FIG. 8, hereinafter is described a third embodiment, focusing on the differences from the first embodiment.

Use of the waste-heat heater may raise a problem if the engine 10 has not been warmed up. The problem in this case is that sufficient heat may not be obtained until the engine 10 is warmed up. Therefore, in this case, the efficiency of the engine 10 is lowered in order to secure heat in a transition period preceding a quasi-equilibrium state (quasi-static state). Then, the engine efficiency is gradually raised to calculate the system cost. However, such a calculation may increase the calculation load of the control unit 50.

In this regard, in the present embodiment, the engine 10 is assumed to be in a quasi-static state when waste-heat heating is estimated while the engine 10 is stopped. Thus, the calculation of the cost that will be incurred in the system can be simplified.

FIG. 8 shows a procedure of selecting a functional device unit that will satisfy a heating request, according to the present embodiment. For example, this procedure is repeatedly performed at a predetermined cycle.

In a series of processes in this procedure, if a heating request is determined to have been made (Yes at step S70), and if the engine 10 is determined to have been stopped (Yes at step S72), control proceeds to step S74. At step S74, it is determined whether or not a predicted value of the vehicle's travel distance is equal to or less than a predetermined distance Lth. This process is performed to predict whether or not the engine efficiency would be extremely deteriorated by operating the waste-heat heater with the engine 10 also being operated. Specifically, if the travel distance is very short, the operating time of the engine 10 will also be very short. Accordingly, by the time the engine 10 is warmed up, the engine 10 will have to be stopped. Therefore, in this case, the heat of the engine 10 cannot be effectively used. It should be appreciated that the prediction of the travel distance can be made using a navigation system, for example, with a destination being inputted into the system. If the prediction is impossible, a determination may be made that the travel distance would exceed the predetermined distance Lth.

If it is determined, at step S74, that the travel distance is equal to or less than the predetermined distance Lth, control proceeds to step S76 where a determination whether to use the heat pump is made. On the other hand, if it is determined that the travel distance exceeds the predetermined distance Lth, control proceeds to step S78 where the cost is calculated for the case where the waste-heat heater is used assuming that the engine 10 is in the quasi-static state. Thus, use of both the waste-heat heater and the heat pump is evaluated. When the quasi-static state is assumed, the heat before warming up is insufficient for the waste-heat heating. Accordingly, the insufficiency is compensated by the heat pump. Thus, there may be a difference between the predicted cost and the actual cost, but the difference here is ignored.

If the process at step S76 or S78 is completed, or if a negative determination is made at step S70 or S72, the series of processes is temporarily ended.

According to the third embodiment described above, further advantages set forth below are obtained in addition to the advantages (1) to (7) of the first embodiment.

(9) The engine 10 has been assumed to be in a quasi-static state while the engine 10 is stopped to calculate the cost incurred in using the waste-heat heater. Thus, the cost can be easily calculated without the need of taking account of the transition period when the warming up of the engine 10 is being accelerated.

(10) When the engine 10 is stopped, the continuous traveling time has been predicted. If the predicted time is equal to or shorter than a predetermined time, it has been determined that the heat pump alone should be used. Thus, the operating time of the engine 10 can be prevented from becoming excessively short.

Fourth Embodiment

Figure 9:
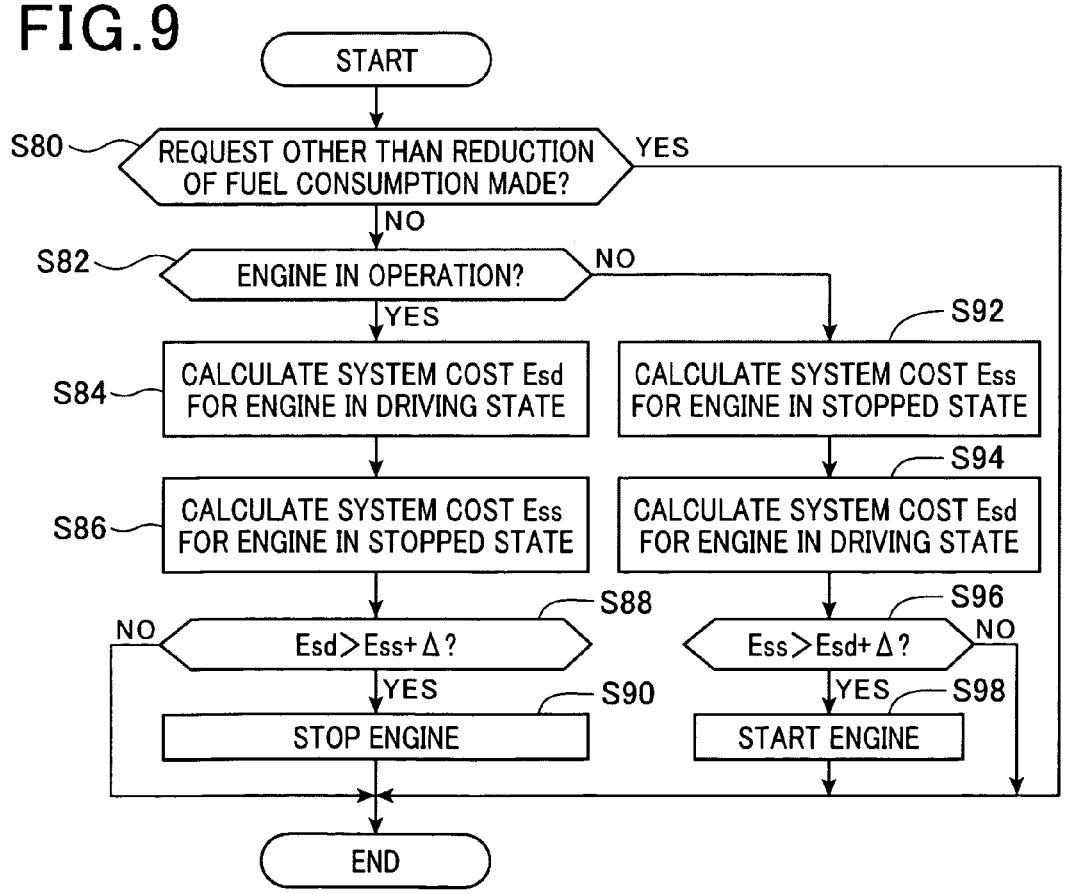
FIG. 9 is a flow diagram illustrating a procedure of selecting a functional device unit, according to a fourth embodiment of the present invention.

Referring to FIG. 9, hereinafter is described a fourth embodiment, focusing on the differences from the first embodiment.

FIG. 9 shows a procedure including the processes performed by the selection control unit 60, according to the fourth embodiment. For example, this procedure is repeatedly performed at a predetermined cycle.

In the present embodiment, the logic of the above procedure is configured, chiefly taking account of the determination on the operation and stoppage of the engine 10 as a main engine. In this procedure, the same processes as those shown in FIG. 5 are performed regarding the matter that the determination on the operation and stoppage of the engine 10 is made based on the total cost incurred in the system.

In a series of the processes in the procedure, it is determined, at step S80, whether or not there are requests other than the request for reducing fuel consumption. The requests here refer to those requests which are particularly associated with driving of the engine 10 and the motor-generator 12. Therefore, if it is determined there are such requests, no degree of freedom is given in determining the operation and stoppage of the engine 10 from a standpoint of reducing the total cost of the system.

If a negative determination is made at step S80, control proceeds to step S82 where it is determined whether or not the engine 10 is in operation. If the engine 10 is determined to be in operation, control proceeds to step S84 where a system cost Esd with the engine 10 being in a driving state is calculated. Being based on the premise here that the engine 10 is driven, no account is taken of the case where a heating request, if any, is to be satisfied by the heat pump alone. However, there is a degree of freedom as to whether the waste-heat heater alone is to be used, or whether the heat pump is to be used in combination with it. Accordingly, the system cost Esd is the minimum of the costs of these potential alternatives. At step S86, a system cost Ess is calculated assuming the engine 10 is in a stopped state. Then, at step S88, it is determined whether or not the system cost Esd with the engine 10 being driven is larger than a value obtained by adding a predetermined quantity Δ to the system cost Ess which is based on the assumption that the engine 10 is in a stopped state. The predetermined quantity Δ here is used intending to add a hysteresis to the determination requirements for the operation and stoppage of the engine 10. Then, if an affirmative determination is made, at step S88, control proceeds to step S90 where the engine 10 is stopped.

On the other hand, if a negative determination is made, at step S82, control proceeds to step S92 where the system cost Ess with the engine 10 being stopped is calculated. Then, at step S94, the system cost Esd is calculated assuming the engine 10 is in a driving state. Then, at step S96, it is determined whether or not the system cost Ess with the engine 10 being in a stopped state is larger than a value obtained by adding the predetermined quantity Δ to the system cost Esd which is based on the assumption that the engine 10 is in a driving state. Then, if an affirmative determination is made at step S96, control proceeds to step S98 where the engine 10 is started.

According to the present embodiment as well, advantages similar to the advantages (1) to (7) of the first embodiment can be obtained. In particular, whether the engine 10 is to be operated or stopped can be appropriately determined from a standpoint of reducing the fuel consumed by the system.

Fifth Embodiment

Figure 10:
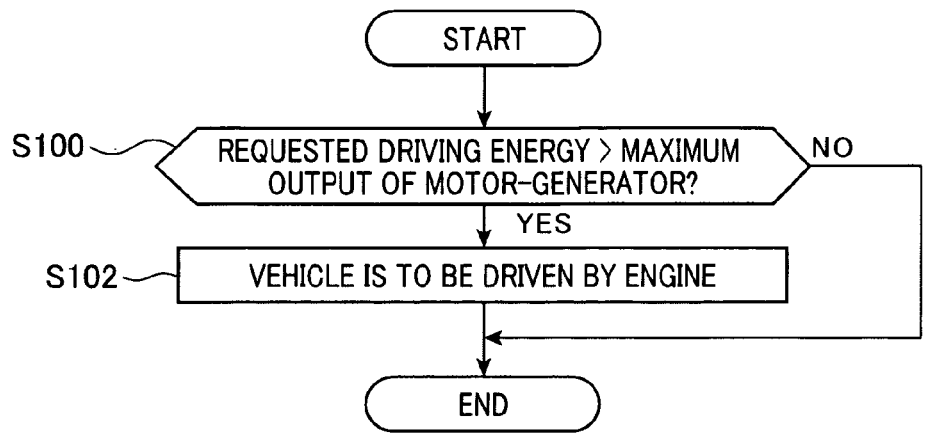
FIG. 10 is a flow diagram illustrating a procedure associated with the determination of engine start, according to a fifth embodiment of the present invention.

With reference to FIG. 10, hereinafter is described a fifth embodiment, focusing on the differences from the first embodiment.

FIG. 10 shows a procedure associated with the determination on the use of the engine 10, according to the fifth embodiment. For example, this procedure is repeatedly performed at a predetermined cycle. Processes performed in this procedure have higher priority than the processes shown in FIG. 5.

In a series of the processes in this procedure, it is determined, at step S100, whether or not a requested driving energy is larger than a maximum output of the motor-generator 12. This process is intended to determine whether or not the requested driving energy can be produced by the motor-generator 12 alone. If an affirmative determination is made at step S100, this means that the motor-generator 12 alone cannot produce the requested driving energy, and thus control proceeds to step S102. At step S102, it is determined that the requested driving energy is to be produced by the engine 10. This process is provided in light of the fact that, up to the upper limit output, the efficiency of the engine 10 becomes higher as the output becomes larger. Accordingly, in many cases, the cost incurred in the system is more reduced when the requested driving energy is produced by the engine 10 alone than when the requested driving energy is produced cooperatively by both the engine 10 and the motor-generator 12. Therefore, in the present embodiment, the sole use of the engine 10 is easily determined by the affirmative determination at step S100.

If the process at step S102 is completed or if a negative determination is made at step S100, the series of processes is temporarily ended.

According to the present embodiment described above, an advantage set forth below can be obtained, in addition to the advantages similar to the advantages (1) to (7) of the first embodiment.

(11) When a requested driving force cannot be realized by the motor-generator 12 alone, it has been determined that the engine 10 should be used to realize the requested driving force. Thus, the usage ratio between the engine 10 and the motor-generator 12 can be easily and appropriately determined.

Sixth Embodiment

Figure 11:
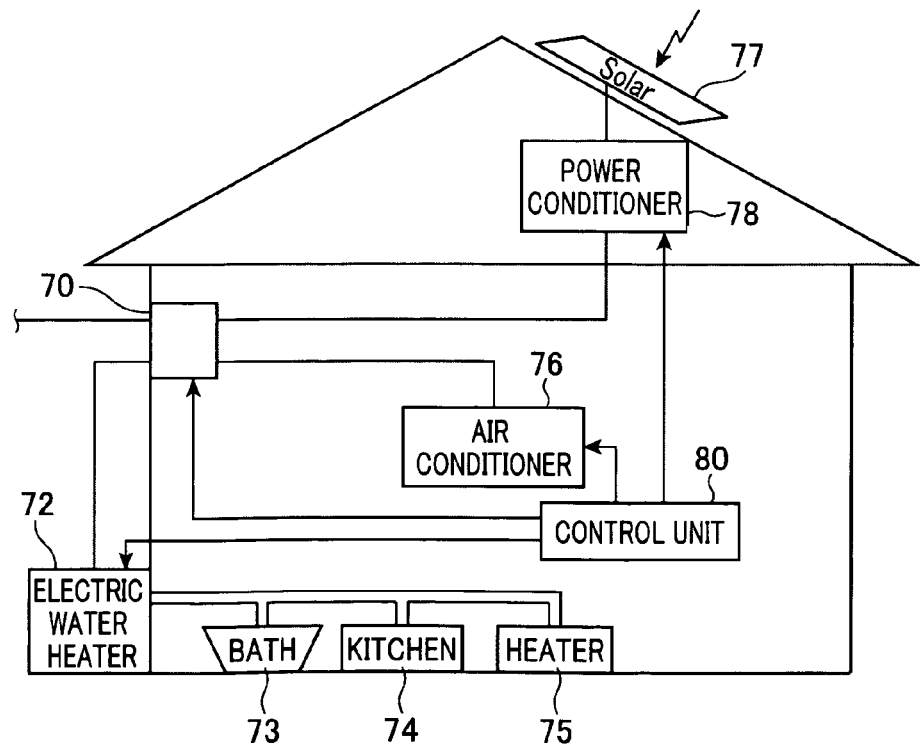
FIG. 11 is a schematic diagram illustrating an energy management apparatus, according to a sixth embodiment of the present invention.

With reference to FIG. 11, hereinafter is described a sixth embodiment, focusing on the differences from the first embodiment.

In the present embodiment, the present invention is applied to a system consisting of a plurality of functional device units, which system is installed in a residential building. FIG. 11 shows a configuration of such a system according to the present embodiment.

FIG. 11 illustrates a residential building including a distribution switchboard 70, electric water heater 72, bath 73, kitchen 74, heater 75, air conditioner 76, solar photovoltaic power generator 77, power conditioner 78 and control unit 80. The distribution switchboard 70 serves as an allocating means having a function of allocating supplied electric energy to a plurality of functional device units, and serves, at the same time, as an outputting means that outputs the electric energy in the residential building to an electric power company. The electric water heater 72 serves as a means for raising the temperature of water, using the electric energy as input energy, which is supplied from the distribution switchboard 70. The water whose temperature has been raised by the water heater 72 is supplied to the bath 73, the kitchen 74 and the heater 75. The kitchen 74 here is provided with a hot-water supplying means. The heater 75 here serves as a means for heating the interior using the heat energy of hot water. The air conditioner 76 is an apparatus that heats or cools the interior using the electric energy supplied from the distribution switchboard 70. The solar photovoltaic power generator 77 converts the solar light into electric energy and supplies the generated electric energy to the distribution switchboard 70 via the power conditioner 78.

The control unit 80 effects control of allocating the electric energy inputted to the distribution switchboard 70 to the plurality of functional device units. In the present embodiment as well, there are two or more functional device units (the heater 75 and the air conditioner 76) that have a similar function of heating the interior. Accordingly, the usage ratio of each of the two or more functional device units having a similar function is determined by performing the processes similar to those shown in FIG. 5. However, in the present embodiment, the paid energy resource is not fuel but the electric energy supplied from an electric power company via the distribution switchboard 70. The electric energy has the same physical quantity as the energy generated by the solar photovoltaic power generator 77. Therefore, it is not desirable to use the quantity, per se, of the electric energy as a parameter for quantifying the cost incurred in the system. Therefore, in the present embodiment, the cost incurred in the system is quantified in terms of the fees (amount of money) billed by the electric power company as a result of using the electric energy.

For the functional device units of the present embodiment, potential input energy forms are electric energy and heat energy for an electric power domain and a heat domain, respectively. Therefore, the average cost is calculated for the electric power domain and the heat domain based on the history of the fees incurred in producing a unit quantity of output energy, billed by the electric power company. These calculation processes can also be performed in a manner shown in FIG. 4. For example, the average cost of the heat domain can be quantified by the fees charged for the electric energy supplied from the electric power company, the fees being of the time point when the heat energy is produced by the electric water heater 72. Accordingly, when the heat energy is produced by the energy generated by the solar photovoltaic power generator 77, the cost for the heat energy is 0-yen/kWh. Therefore, the average cost of the heat domain becomes low.

At step S20 of FIG. 5, it is determined whether or not there are requests other than reducing the fees that will be billed by the electric power company. Here, the presence of the requests other than reducing the fees may be determined, for example, in the case where the user designates the use of a specific heating means, such as the heater 75. If a specific heating means has not been designated and if a heating request is made, an affirmative determination is made at step S22 of FIG. 5. Then, it will be determined which use of the heater 75 or the air conditioner 76 can reduce the fees billed by the electric power company.

Specifically, let us assume that the cost of the electric power domain is "20-yen/kWh", and the requested heating of the interior is "3 kW". In the case where the air conditioner 76 is used, it is taken into account that the heating performance changes according to the environments where the air conditioner 76 is placed, while the output of the compressor remains the same. Taking this into account, the requested heating is converted into the input electric energy of the compressor based on the environmental information. This conversion process may be performed using the performance factor COP, for example, described in JP-A-2008-018797, for example. The performance factor COP may be set as the environmental information based on the current temperature of the interior. For example, when the performance factor COP is 3, the electric power to be used by the air conditioner 76 is "3 kW/3=1 kW". Accordingly, the cost for the case where the air conditioner 76 is used is "1 kW×20-yen/kWh=20-yen/h".

In the case where the heater 75 is used, when the heat-exchange efficiency of the heater is 50%, the requested heat energy to be fed is 6 kW. Accordingly, when the average cost of the heat domain is 3-yen/kWh, the cost in this case is "6 kW×3-yen/kWh=18-yen/h".

According to the present embodiment described above, the following advantage can be obtained in addition to the advantages similar to the advantages (1), (2) and (6) of the first embodiment.

(12) The present invention has been applied to the system including the heater 75 and the air conditioner 76, which system is installed in a residential building. In this system, the fees charged for the electric energy supplied from the electric power company can change depending on time, and the electric water heater 72 has a function of storing heat energy to be supplied to the heater 75. Therefore, in this case, the cost incurred in the system cannot be appropriately quantified, relying on the consumption of the electric energy. For this reason, it is particularly effective to quantify the cost based on the fees charged for the electric energy supplied from the electric power company.

Seventh Embodiment

Figure 12:
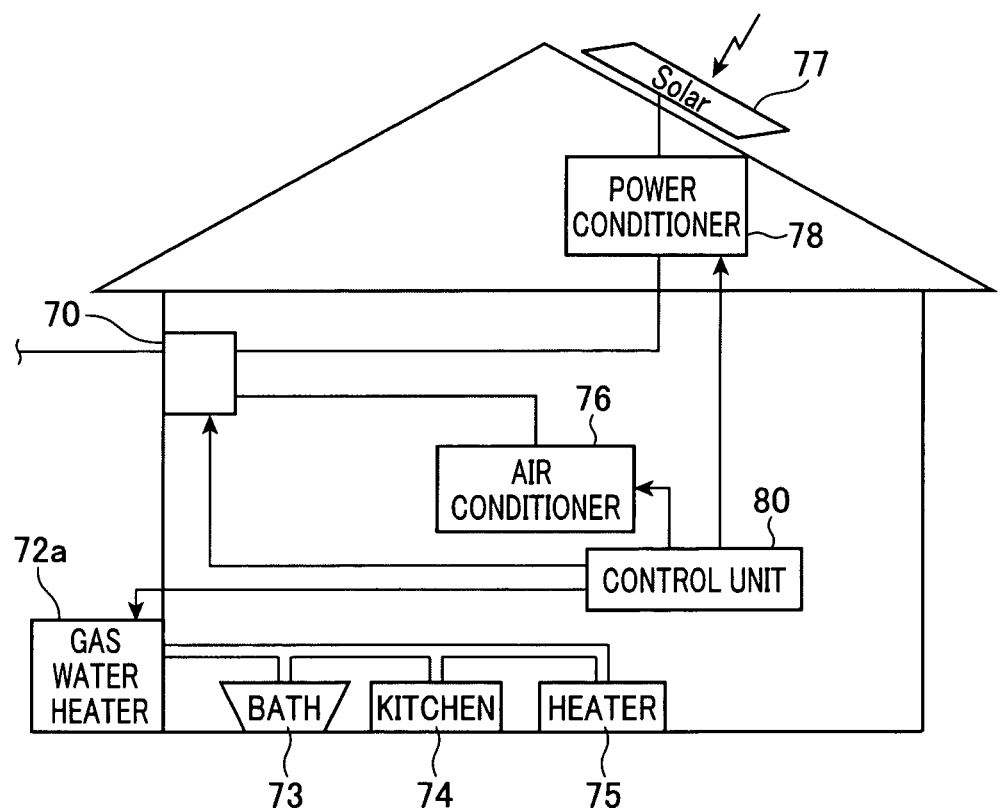
FIG. 12 is a schematic diagram illustrating an energy management apparatus, according to a seventh embodiment of the present invention.

With reference to FIG. 12, a seventh embodiment is described, focusing on the differences from the sixth embodiment.

FIG. 12 shows a configuration of a system associated with the sixth embodiment. In FIG. 12, the components corresponding to those shown in FIG. 11 are designated with the same references.

As shown in FIG. 12, a gas water heater 72a is provide, in the present embodiment, as a water heater. In this case, gas is used as a direct input energy form for the gas water heater 72a. Specifically, in the system of the present embodiment, two paid energy sources are available, i.e. the electric energy from an electric power company and gas from a gas company.

However, in this case as well, the cost can be quantified by the fees incurred in producing the input energy. Thus, the cost incurred in the system can be appropriately quantified.

Eighth Embodiment

Figure 13:
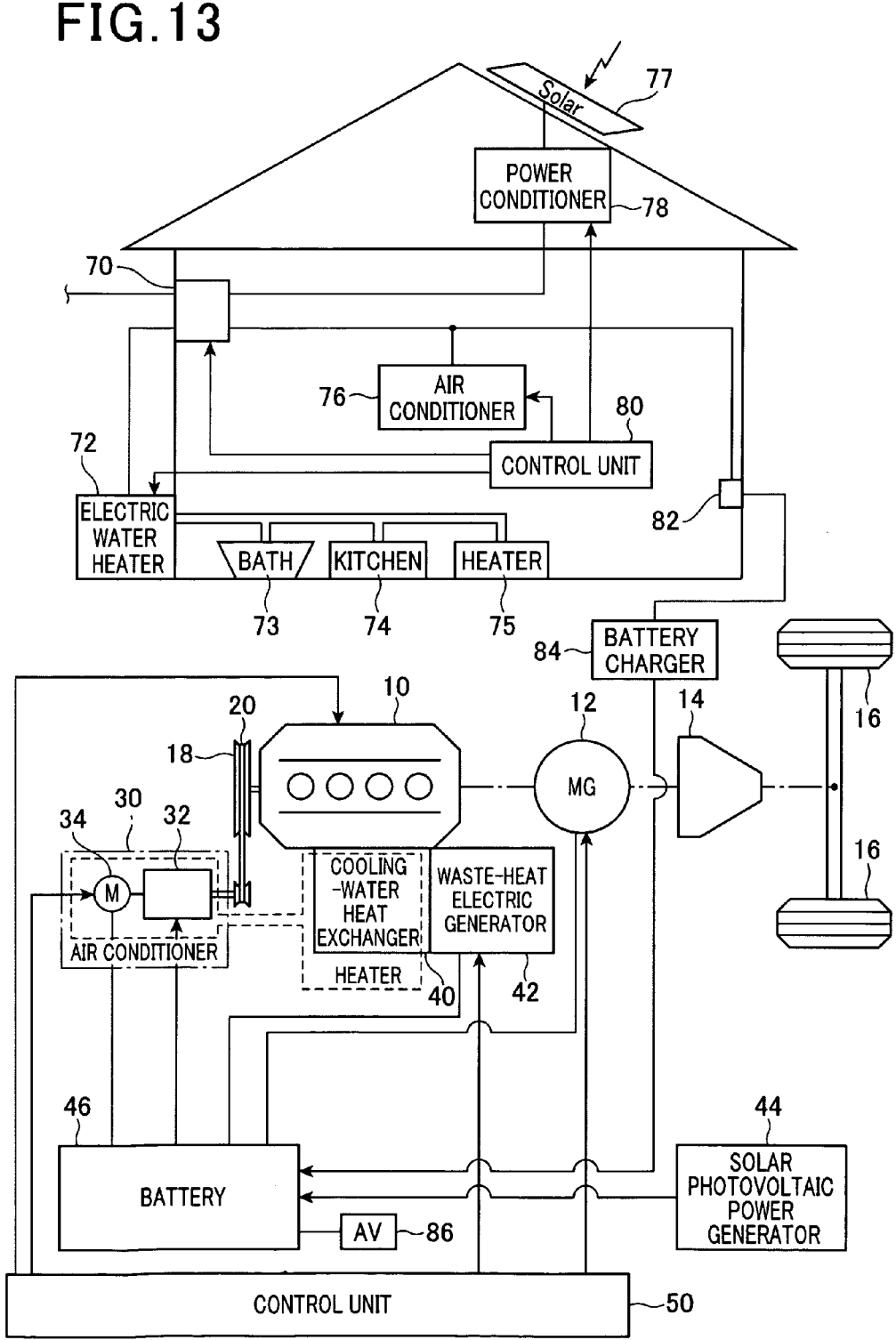
FIG. 13 is a schematic diagram illustrating an energy management apparatus, according to an eighth embodiment of the present invention.

Referring to FIG. 13, an eighth embodiment is described, focusing on the differences from the sixth embodiment.

FIG. 13 shows a configuration of a system associated with the eighth embodiment. In FIG. 13, the components corresponding to those shown in FIG. 11 are designated with the same references.

As shown in FIG. 13, the system of the present embodiment includes both of the system of a residential building and the system of a vehicle. In the present embodiment, the residential building is provided with a plug socket 82 to externally output the electric energy supplied from the distribution switchboard 70. Also, the vehicle is provided with a battery charger 84 to charge the electric energy outputted from the plug socket 82 into the battery 46. Further, audio-visual equipment 86 is connected to the battery 46.

Two paid energy resources are available in this system, i.e. fuel for the engine 10 and electric energy from an electric power company. An issue in this case is that the quantification involving the fees (amount of money) charged for the electric energy from the electric power company is different from the quantification involving the fuel of the engine 10. Therefore, in quantifying the cost, conversion is required for at least one of the fees and the fuel. Here, since the fuel quantity can be converted into an amount of money, the cost can be quantified by an amount of money. On the other hand, since the amount of money can be converted to a fuel quantity, the cost can also be quantified by the fuel quantity. In any case, the processes similar to those shown in FIG. 5 may be performed to make a selection that can reduce the fees the user of the system would finally pay to the companies. In the present embodiment, the average cost of the electric power domain is defined for each of the residential building and the vehicle.

An explanation is given here on the processes of minimizing the cost incurred in the system, taking as an example the case where the audio-visual equipment 86 is used while the vehicle interior is heated under the conditions that the vehicle is stopped near the residential building. In this case, a selection can be made from either the case where the audio-visual equipment 86 is used with the electric power from the electric power domain of the vehicle, while the waste-heat heater is also used with the engine 10 being in an idling mode (Setting 1); or the case where electric power is supplied to the heat pump and the audio-visual equipment 86, from outside the vehicle, i.e. from the residential building (Setting 2).

Setting 1. Use of Waste-Heat Heater+Battery 46:

In this case, the waste-heat heater is used by permitting the engine 10 to operate in the idling mode. Let us assume that the cost for the idling-mode operation is 900 g/h, the electric power required for the audio-visual equipment 86 is 300 W, and the average cost CE of the electric power domain of the vehicle is 120 g/kWh. In this case, the total cost incurred in the system will be "900 g/h+300 W×120 g/kWh=1260 g/h".

Setting 2. Use of Waste-Heat Heater+Electric Power from the Residential Building:

Here, when the energy required for the heat pump is 3 kW and the average cost of the electric power domain of the residential building is 20-yen/kWh, the total electric power to be supplied is "3 kW+300 W=3.3 kW". Accordingly, the total cost incurred in the system will be "3.3 kW×20-yen/kWh=66-yen/h".

Being in different dimensions, the total costs of Settings 1 and 2 are incomparable. Therefore, these total costs are converted into the quantity of the same dimension. Specifically, a current fuel price of 120-yen/L and a gasoline density of 0.75 are used to calculate an amount of money per unit fuel quantity, which is 160-yen/kg. Thus, when the cost is quantified by fuel quantity, for example, the total cost of Setting 2 will be "66-yen/h÷160-yen/kg=413 g/h", which is lower than the total cost of Setting 1. When the cost is quantified by an amount of money, for example, the total cost of Setting 1 will be "1260/h×160-yen/kg=202-yen/h". In this case as well, the total cost of Setting 2 is lower than that of Setting 1.

The fuel price can be updated by providing the vehicle with a fuel price inputting means and by inputting the current fuel price into the inputting means when fuel is fed to the vehicle. Alternatively, in the case where the residential building is furnished with an internet terminal, the current fuel price information acquired via the internet may be used.

Ninth Embodiment

Figure 14:
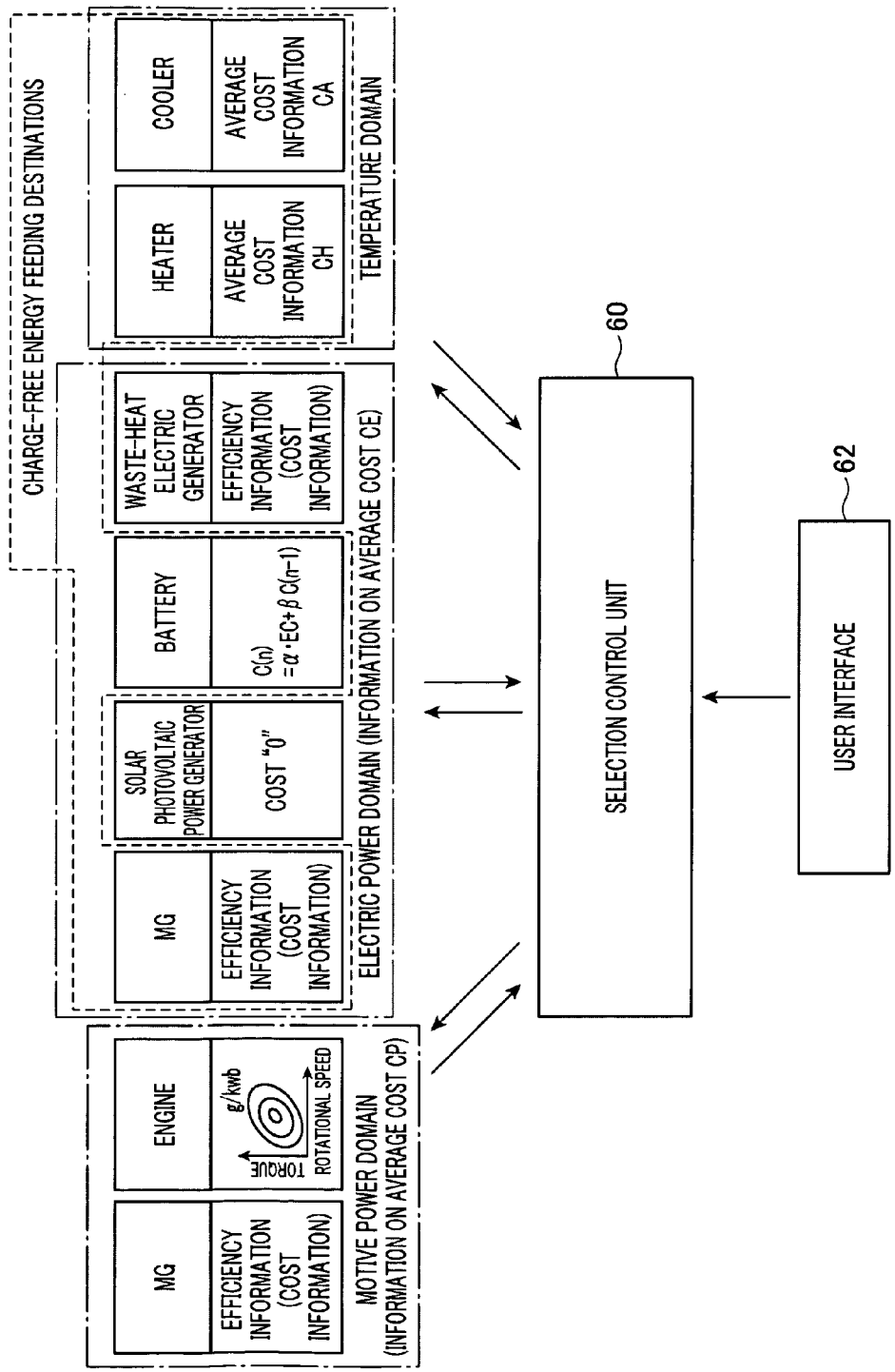
FIG. 14 is a block diagram illustrating the processes associated with energy management, according to a ninth embodiment of the present invention.
Figure 15:
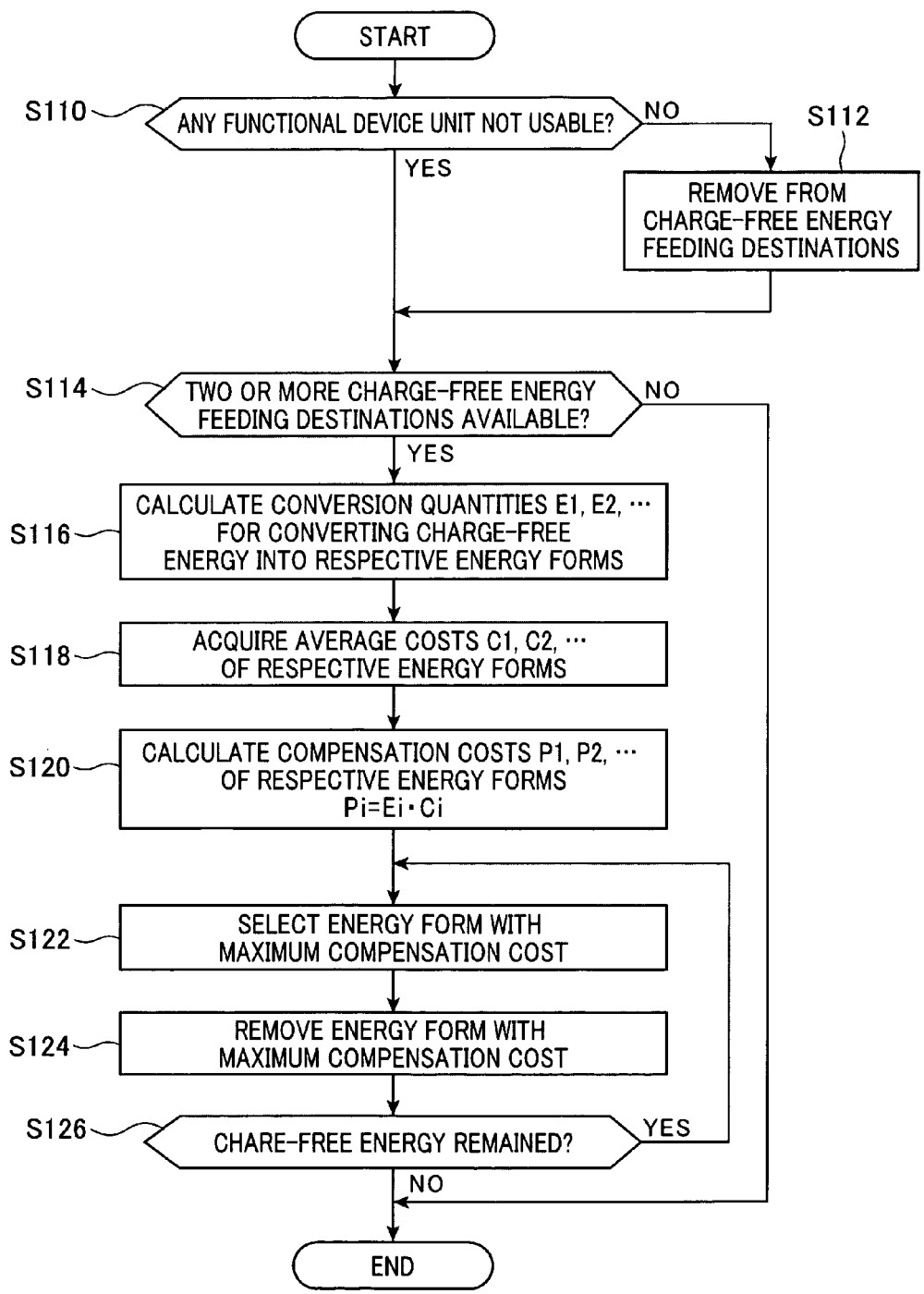
FIG. 15 is a flow diagram illustrating a procedure of selecting a destination to which charge-free energy is to be fed, according to the ninth embodiment.

Referring to FIGS. 14 and 15, hereinafter is described a ninth embodiment, focusing on the differences from the first embodiment.

In the ninth embodiment, the process of selecting the destination of feeding charge-free energy is also performed. The present embodiment is described taking as examples "1. The System of FIG. 1", "2. The System of FIG. 11" and "3. The System of FIG. 13" to each of which a system of the present embodiment is applied.

<1. Application to the System of FIG. 1>

In this case, usable charge-free energy includes rotational energy of the drive wheels 16 during deceleration of the vehicle or during travel on a downgrade, solar-generated energy, and the waste heat of the engine 10. Waste heat can be regarded as charge-free energy when the waste heat corresponds to the loss in converting fuel into driving force in response to a driving request to the engine 10. In other words, when the engine efficiency is lowered only for the purpose of using the waste heat, as described above, such waste heat energy is not regarded as charge-free energy.

FIG. 14 is a block diagram associated with the processes of selecting a destination of feeding charge-free energy, which are performed by the control unit 50.

As shown in FIG. 14, destinations of feeding charge-free energy are stored in advance in the present embodiment. The destinations of feeding charge-free energy here are designated to the functional device units whose input energy form is electric energy, and also to the heater and the cooler. The destinations of feeding rotational energy of the drive wheels 16 include the functional device units whose input energy form is electric energy and the functional device units having a cooling function based on the driving force. The destinations of feeding the waste heat of the engine 10 include the functional device units whose input energy form is electric energy and the functional device units of the waste-heat heater. Thus, there are a plurality of functional device units that are the destinations of feeding charge-free energy. In the selection control unit 60, the destinations of feeding charge-free energy are determined so that the consumption of the paid energy resources in the system (fuel consumption) can be reduced.

What is particularly important here is the selection of the functional device units having different functions, as the destinations of feeding charge-free energy, from among the plurality of functional device units constituting the system. In the present embodiment, the selection of the functional device units to which charge-free energy is fed is made through some processes. In the processes, it is determined which of the output energy forms of the functional device units the charge-free energy should preferentially converted to.

In order to make this determination, an average cost is calculated, in the present embodiment, based on the history of the quantity of the paid energy resource required for outputting a unit quantity of energy, for each of the functional device units having a similar function. Specifically, average costs PC, CE, CH and CA are calculated, respectively, for the motive power domain for producing the driving force of the vehicle, the electric power domain for supplying electric energy, the heat pump and the waste-heat heater each having a function of heating the vehicle interior, and the cooler having a function of cooling the vehicle interior.

These processes may be performed in a manner shown in FIG. 4. In fact, the output energy form of each of the heat pump and the waste-heat heater having a function of heating the vehicle interior is the heat energy having a higher temperature than the temperature of an object to be controlled. Also, the output energy form of the cooler having a function of cooling the vehicle interior is the heat energy (cold energy) having a lower temperature than the temperature of an object to be controlled.

FIG. 15 shows a procedure of selecting a destination to which the charge-free energy is to be fed. For example, this procedure is repeatedly performed at a predetermined cycle.

In a series of processes in the procedure, it is determined, at step S110, whether or not there are functional device units that are not usable as destinations of feeding the charge-free energy. For example, even when the torque of the drive wheels 16 is obtained from the charge-free energy, the compressor 32 is not usable as a destination of feeding the charge-free energy unless there is a request for using the air conditioner 30. If an affirmative determination is made at step S110, control proceeds to step S112 where those functional device units are removed, which are not usable as the destinations of feeding the charge-free energy.

If a negative determination is made at step S110 or when the process at step S112 is completed, control proceeds to step S114. At step S114, it is determined whether or not two or more destinations are available, to which the charge-free energy can be fed. If it is determined that there are two or more destinations, at step S114, control proceeds to step S116. At step S116, conversion quantities E1, E2, E3, . . . are calculated for the case where the charge-free energy is converted to the input energy forms of the respective candidate destinations of feeding the charge-free energy.

This process is performed in light of the fact that, when charge-free energy is converted into a specific energy form, the actual quantity of conversion depends on the conversion timing, or the like. For example, the motor-generator 12, the waste-heat electric generator 42, the solar photovoltaic power generator 44 and the battery 46 each have an output energy form of electric energy. When the charge-free energy is converted to the electric energy for these functional device units, the quantity of energy resulting from actual conversion may vary, depending on the generation efficiency of the motor-generator 12. At the subsequent step S118, average costs C1, C2, . . . are acquired for the respective functional device units having a similar function (for the respective energy forms) mentioned above.

At the subsequent step S120, compensation costs P1, P2, . . . are calculated, which correspond to the costs incurred in compensating the conversion quantities by another means, which have been calculated at step S116, without feeding the charge-free energy to the individual functional device units.

The compensation costs P1, P2, . . . can each be calculated by multiplying a conversion quantity $E_i$ calculated at step S116 with an average cost. $C_i$ acquired at step S118. Since the average cost results from the quantification based on the history of the costs in the past, each compensation cost can be regarded as appropriately expressing the cost incurred in the compensation, by a different means, of the energy associated with the conversion quantity $E_i$ of the charge-free energy.

At the subsequent step S122, an energy form having the maximum compensation cost is selected. Then, after determining the selected energy form as an object of conversion from the charge-free energy, control proceeds to step S124. At step S124, the selected energy form is removed from the candidate destinations of feeding the charge-free energy. Then, it is determined, at step S126, whether or not the charge-free energy still remains. This process is performed in light of the fact that, under certain conditions, charge-free energy cannot be fully converted into a single energy form. For example, the charge-free energy that can be fed to the compressor 32 to realize cooling is restricted by the quantity of cooling requested.

If an affirmative determination is made at step S126, control returns to step S122 to select an energy form that can provide the maximum compensation cost, from the candidate objects of conversion. Then, control proceeds to step S124. On the other hand, if a negative determination is made at step S126 or if a negative determination is made at step S114, the series of processes is temporarily ended.

In the following explanation, the series of processes is applied to the case where either the functional device units having an input energy form of electric energy or the functional device units having a cooling function is selected as a destination of feeding the rotational energy (1 kW) of the drive wheels 16.

(a) Compensation Cost P1 of the Functional Device Units Having an Input Energy Form of Electric Energy:

When the conversion efficiency of the motor-generator 12 is 80%, the conversion quantity E1 for the electric energy is 1 kW×0.8=800 W. When the average cost CE of the electric power domain is 250 g/kWh, the compensation cost P1 is "800 W×250 g/kWh=200 g/h".

(b) Compensation Cost P2 of the Cooler:

When the conversion efficiency (the performance factor COP mentioned above) for a cooling quantity then is 2.5, the conversion quantity E2 for the cooling output is "1 kW×2.5=2500 W". When the average cost CA of the cooler is 50 g/kWh, the compensation cost P2 is "2500 W(50 g/kWh=125 g/h".

From the above, the compensation cost P1 is the maximum in this example. Accordingly, the functional device units having an input energy form of electric energy are selected as a destination of feeding the charge-free energy.

In the following explanation, the series of processes is applied to the case where either the functional device units having an input energy form of electric energy or the waste-heat heater is selected as a destination of feeding the waste heat (1 kW) of the engine 10.

(c) The Compensation Cost P1 of the Functional Device Units Having an Input Energy Form of Electric Energy:

When the conversion efficiency of the waste-heat electric generator 42 is 80%, the conversion quantity E1 for the electric energy is "1 kW×0.8=800 W". When the average cost CE of the electric power domain is 250 g/kWh, the compensation cost P1 is "800 W×250 g/kWh=200 g/h".

(d) The Compensation Cost P3 of the Waste-Heat Heater:

When the conversion efficiency (the performance factor COP mentioned above) for heating then is 2.5, the conversion quantity E3 for the output energy of the waste-heat heater is "1 kW×2.5=2500 W". When the average cost CH of heating is 50 g/kWh, the compensation cost P3 is "2500 W×50 g/kWh=125 g/h".

From the above, the compensation cost P1 is the maximum in this example. Accordingly, the functional device units having an input energy form of electric energy is selected as a destination of feeding the charge-free energy.

<2. Application to the System of FIG. 11>

The charge-free energy here is solar-generated energy. The explanation here takes as an example the case where, when the solar-generated energy exceeds the electric energy currently requested in the residential building, a selection is made from either selling the solar-generated energy to an electric power company, or converting the solar-generated energy into heat energy by the electric water heater 72. In other words, in this example, either the use of the distribution switchboard 70 or the use of the electric water heater 72 is selected to determine the destination of feeding the solar-generated energy (1.5 kW).

Similar to the sixth embodiment, the cost here is quantified by an amount of money, taking into account that the paid energy resource is the electric energy from an electric power company.

(e) The Compensation Cost of the Electric Water Heater 72:

When the conversion efficiency (the performance factor COP mentioned above) of converting the fed energy into heat energy is 2, the conversion quantity for the heat energy is "1.5 kW×2=3 kW". When the average cost of the heat energy outputted from the electric water heater 72 is 4-yen/kWh, the compensation cost is "3 kW(4-yen/kWh=12-yen/h".

(f) The Compensation Cost Incurred in Electric Power Selling:

When the electric power selling price is 50-yen/kWh, the average cost also will be 50-yen/kWh. Accordingly, the compensation cost is "1.5 kW×50-yen/kWh=75-yen/h".

Thus, the compensation cost is the maximum when the electric power is sold. Accordingly, electric power selling is selected.

For example, electric power selling cannot be selected sometimes due to the voltage rise or the like in an electric path of the electric power company, which voltage rise is larger than that in the distribution switchboard 70. In such a case, it is determined, at step S16 of FIG. 15, that a functional device unit not usable is present.

<3. Application to the System of FIG. 13>

The explanation here takes as an example the case where a selection is made from either the distribution switchboard 70 that outputs the electric energy to be sold to the electric power company, or the functional device units, in the vehicle, that has an input energy form of electric energy, as a destination of feeding the solar-generated energy (1.5 kW).

(g) The Compensation Cost of the Functional Device Units Having an Input Energy Form of Electric Energy in the Vehicle:

The compensation cost for the case where the solar-generated energy of the residential building is not fed is calculated here based on the average cost of the electric power domain of the residential building. This calculation is based on the idea that, under the conditions where there is a request for charging the battery 46, the battery 46 is charged by the electric energy of the residential building prior to the electric generation such as of the motor-generator 12 with the traveling of the vehicle, even when the solar-generated energy of the residential building has not been fed.

When the average cost CE of the electric power domain of the residential building is 12-yen/kWh, the compensation cost P1 is "1.5 kW×12-yen/kWh=18-yen/h". Accordingly, when the compensation cost incurred in selling the electric power is as calculated in the above item (f), the outputting means provided at the distribution switchboard 70 to output electric energy to the electric power company is selected as a destination of feeding the solar-generated energy.

The cost here has been quantified by an amount of money. As a matter of course however the cost may be quantified by fuel quantity.

According to the present embodiment described so far, the following advantages can be obtained.

(13) When there are two or more functional device units as destinations of feeding charge-free energy, the charge-free energy has been converted into the output energy of each of the functional device units. Then, the cost has been calculated, which will be incurred in compensating the quantity of energy resulting from the conversion with the energy other than the charge-free energy. Then, the functional device units resulted in large cost has been preferentially selected as a destination of feeding the charge-free energy. Thus, the destination of feeding charge-free energy can be determined such that the consumption of the paid energy resources in the system can be reduced.

(14) The average cost used for calculating the compensation cost has been calculated based on the history of the paid energy resource which has been required every time the output energy of the functional device units concerned is produced. Thus, the compensation cost can be calculated based on the trend in the past of consuming the paid energy resource by the functional device units concerned.

(15) It has been determined whether or not there is any functional device units among the two or more functional device units, the use of which is not desirable in satisfying an external request. If an affirmative determination is made, the functional device units in question have been removed from the candidates of feeding charge-free energy. Thus, a more appropriate selection can be made for the destination of feeding charge-free energy.

Tenth Embodiment

Figure 16:
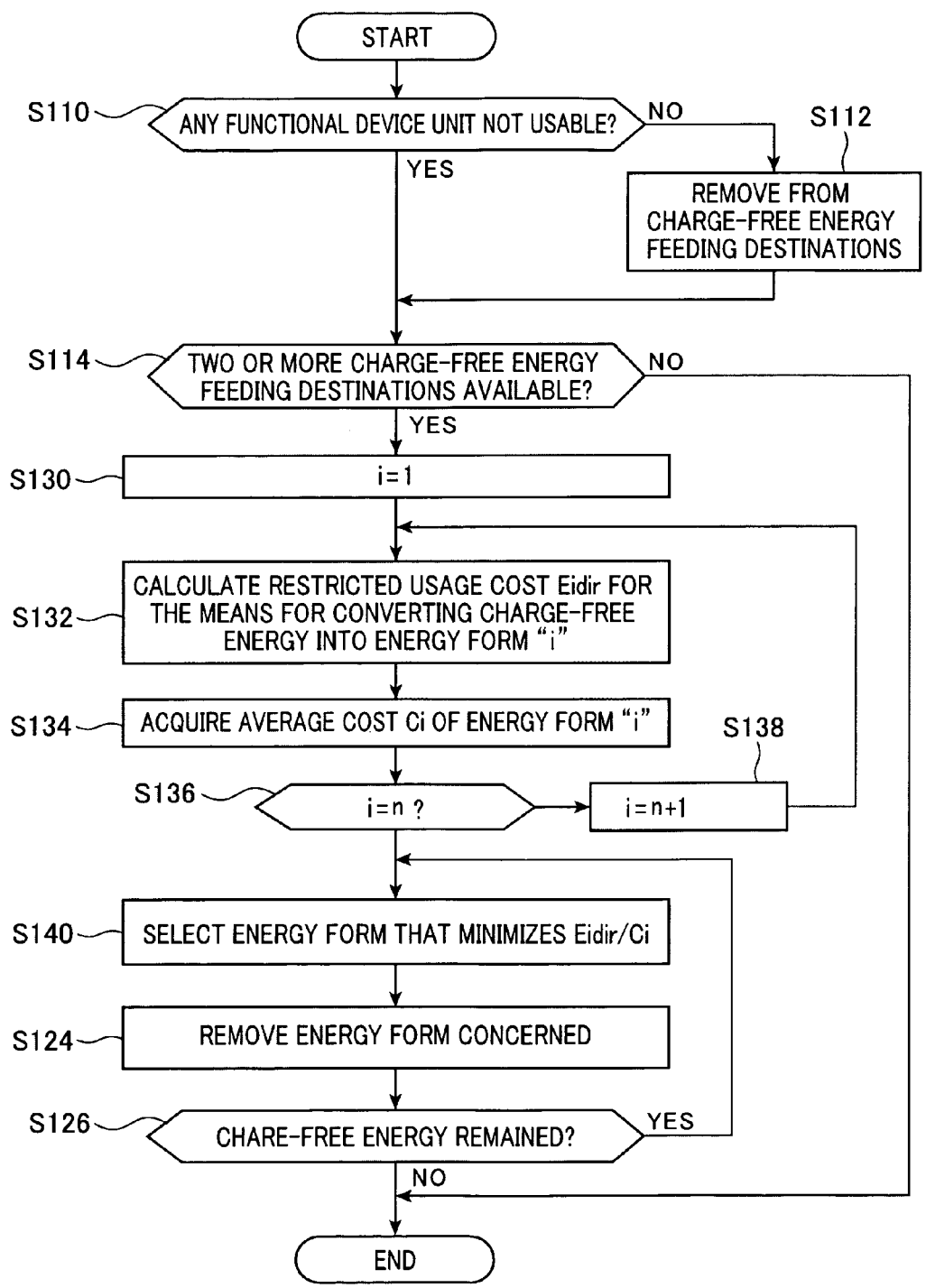
FIG. 16 is a flow diagram illustrating a procedure of selecting a destination to which charge-free energy is to be fed, according to a tenth embodiment.

Referring to FIG. 16, hereinafter is described a tenth embodiment of the present invention, focusing on the differences from the ninth embodiment.

FIG. 16 shows a procedure of selecting a destination of feeding charge-free energy. For example, this procedure is repeatedly performed at a predetermined cycle. In the procedure shown in FIG. 16, those processes which correspond to the processes of FIG. 15 are designated with the same references for the sake of convenience.

In a series of these processes in the procedure, the same processes as at steps S110 to S114 of FIG. 15 are performed first. Then, if an affirmative determination is made at step S114, control proceeds to step S130. At step S130, a numeral "1" is used as a reference "i" to designate an energy form that is a candidate object into which the charge-free energy is converted. Then, at step S132, the cost incurred in producing a unit quantity (restricted usage cost Eidir) of the energy form "i" is calculated for the case where only the means used for converting the charge-free energy into the energy form "i" is used. For example, when the energy form "i" is electric energy and the charge-free energy is the torque of the drive wheels 16, the motor-generator 12 corresponds to the above means. Therefore, the cost incurred in producing the electric energy using the motor-generator 12 is calculated.

At the subsequent step S134, an average cost Ci of the energy form "i" is acquired. The definition of the average cost Ci is the same as in the ninth embodiment. The processes at steps S132 and S134 are performed for all of the energy forms which are the candidates of conversion of the charge-free energy (steps S136 and S138).

When the processes at steps S132 and S134 have been completed for all of the energy forms, control proceeds to step S140. At step S140, the restricted usage cost Eidir is divided by the average cost Ci, for each of the energy forms. The energy form having the minimum value as a result of the division is determined as an object into which the charge-free energy is converted.

In the following explanation, the above series of processes is applied to the system of FIG. 1. The explanation is given taking as an example of the case where the charge-free energy is the deceleration regenerative energy of the drive wheels 16, and where a selection is made regarding the destination of feeding the charge-free energy, between a functional device unit having an input energy form of electric energy and a functional device unit having an output energy form of cold energy (functional device units having a cooling function).

In this case, the means for producing electric energy includes the waste-heat electric generator 42 and the solar photovoltaic power generator 44, besides the motor-generator 12. Therefore, an average cost Ci can be different from the restricted usage cost Eidir. Meanwhile, the means for converting the charge-free energy into cold energy is the compressor 32 alone. Therefore, the average costs calculated at both of steps S132 and S134 will be the same. Thus, at step S140, the energy form having a smaller ratio (the value resulting from the division of the restricted usage cost Eidir by the average cost Ci) can be specified.

The energy form having the minimum ratio will have a larger ratio of the average cost Ci to the cost incurred in feeding energy restrictively to the means for converting the charge-free energy. This is considered to mean that the energy cost of this energy form is usually large. This corresponds to the matter of large compensation in the ninth embodiment described above.

According to the present embodiment described above, the following advantage is obtained.

(16) High priority has been assigned to the energy form having a smaller ratio of the restricted usage cost Eidir to the average cost Ci. Thus, the destination of feeding the charge-free energy can be selected so that the consumption of the paid energy resource can be reduced.

(Modifications)

The embodiments described above may be implemented being modified as set forth below.

The moving average process used in calculating a storage cost for the battery 46 may not be limited to the exponential moving average process, but may be a simple moving average process, or the like.

The moving average process used in calculating the average cost CE of the motive power domain may not be limited to the exponential moving average process, but may be a simple moving average process, or the like.

The embodiments described have each exemplified a calculating means for the unit cost EC in charging a unit quantity of energy to the battery 46 in the case where there is a request for actuating the engine 10, which has been in a stopped state, to generate electric power. In the exemplified calculation means, the average cost EC has been calculated based on the increase of the cost incurred in the driving of the motor-generator 12. Alternatively, however, the average cost EC may be calculated based on the increase of the cost incurred in electric power generation, with respect to the cost incurred in producing the driving force with the engine 10.

The first embodiment presented an example of satisfying a request by two or more functional device units (the waste-heat heater and the heat pump, and the waste-heat electric generator 42 and the motor generator 12) having a similar function. In the example, the cost to be incurred has been calculated based on the efficiency information of these functional device units. Alternative to this however the cost to be incurred may be calculated based on an average cost calculated in advance, similar to the battery 46 or the like. It is desirable in this case that the average cost more strongly reflects the cost information in the past which is close to the present as much as possible.

Regarding those two or more functional device units which have an input energy form equal to the output energy form, for example, an average cost of the entire output energy may be calculated, similar to the motive power domain. This means that an average cost is calculated for both of the electric power domain and the motive power domain. According to this, the cost for the input energy of the compressor 32 in using the heat pump can be calculated based on the average cost of the motive power domain.

In the second embodiment, the average cost CE of the electric power domain has been corrected when the charge-free energy is estimated to be increased. Alternatively, the average cost CE may be corrected when the charge-free energy is estimated to be decreased.

The future prediction information of the environments where the vehicle system is situated is not limited to the information regarding the availability of solar photovoltaic power generation. For example, the future prediction information may be the information regarding the availability of the deceleration regenerative energy, which information is based on the slope information of a road surface or the like.

The exponential moving average process has been used for calculating an average cost of the energy form into which charge-free energy is to be converted. Alternative to this however a simple moving average process or the like may be used.

The ninth embodiment has presented an example of compensating energy into which charge-free energy is to be converted. The average cost used in this example has been calculated based on the costs in the past (history) which is closest to the present, which costs have been incurred every time the energy subjected to conversion is produced. In this regard, let us take as an example the combined system of a residential building and a vehicle exemplified in the ninth embodiment. In this case, the battery 46 is considered to be principally charged by the electric power domain of the residential building late at night when the nighttime power discount is applied. Therefore, the average cost in this case may desirably be the one calculated from the nighttime costs in the past. Thus, when the period of calculating a compensation cost is predicted to be the period when no charge-free energy is fed, it is desirable that an average cost calculated from the costs in the predicted period (the nighttime period in the above case) is used.

In the ninth embodiment, the battery 46 has been considered as a destination of feeding the solar-generated energy of the residential building. In this case, the compensation cost has been calculated based on the average cost of the electric power domain of the residential building. However, alternative to this, the compensation cost may be calculated based on the average cost of both of the electric power domain of the residential building and the electric power domain of the vehicle. Alternatively, in the case where the vehicle starting processes are determined to be performed shortly based on daily habit information or the like, the compensation cost may be calculated using the average cost of the electric power domain of the vehicle. Such setting is particularly effective in a hybrid vehicle, for example, equipped with an electric power generating means. Not limiting to this example, it is generally effective to variably set a definition of an average cost according to the functional device units whose compensation cost is predicted to be calculated for the period when no charge-free energy is fed.

In the ninth embodiment, the average cost of the energy form that is an object into which charge-free energy is converted has been calculated based on the history of the costs incurred every time the energy subjected to conversion is produced. However, alternatively, the average cost may be calculated additionally taking account of the future prediction information of the environments where the system is situated, as in the second embodiment.

In the ninth embodiment, the compensation cost has been calculated using an average cost. Alternatively, however, the cost per unit quantity of output energy at present of each functional device unit may be calculated based on the efficiency information of the functional device units as in the first embodiment, for use as an average cost. In this case as well, the compensation cost can be calculated. Further, in this case, it is effective to consider the future prediction information.

A moving average process has been used in calculating each of the above costs based on the history of the quantity of the paid energy resource required for producing each unit quantity of energy. What matters is that the process may only have to be a quantification process which strongly reflects the quantity of the paid energy resource required for producing each unit quantity of energy in the past which is closer to the present. Thus, the cost at present and in the near future can be quantified with high accuracy. However, if the quantity of a paid energy resource that substantially gives an influence to the cost involves only the values of the past which is very close to the present, hunting phenomenon can occur. The hunting phenomenon may desirably be avoided. The hunting phenomenon may occur when, for example, the average cost CE or the like of the electric power domain varies in a large scale, under the conditions where the quantity of energy generated by the solar photovoltaic power generator 44 is drastically reduced when the vehicle instantaneously enters a shaded area.

The hybrid system may not be limited to the parallel hybrid system, but may, for example, be a parallel-series hybrid system. Alternatively, the system may be a series hybrid system. In the case of the series hybrid system, only the motor-generator serves as the main engine of the vehicle. Meanwhile, the series hybrid system may be equipped, for example, with a heating means for heating the vehicle interior by exchanging heat with a cooling device that cools the motor-generator, and a heat pump. In this case as well, it is effective to make a selection in a manner of the first and second embodiments, regarding which of the heating means and the heat pump is to be used to satisfy the request for heating the vehicle interior. In selecting a destination of feeding charge-free energy, it is effective to apply the ninth and the tenth embodiments.

The vehicle may not be limited to a hybrid vehicle, but may, for example, be a vehicle having an idle-stop function, or a vehicle only provided with an internal combustion engine as a main engine. In this case, an alternator or the like may serve as a means for generating electric power using deceleration regenerative energy. Further, the vehicle may not be limited to the one equipped with an internal combustion engine, but may be an electric vehicle only equipped with a motor-generator as a main engine.

What is claimed is:

1. An energy management apparatus for managing energy to be supplied to a system to which a paid energy resource can be supplied from outside, which is provided with two or more functional device units realizing a specific function using the input energy and adapted to satisfy an external request using at least one of the two or more functional device units such that supply of energy to the functional device units can be controlled, the apparatus comprising:
    a normalizing unit for normalizing input energy of each of the two or more functional device units in terms of a cost of the paid energy resource required for producing the input energy; and
    a determining unit for determining to which of the two or more functional device units a predetermined quantity of energy should be fed such that the cost of the paid energy resource incurred in the system to which the paid energy resource can be supplied from outside is reduced.

2. The apparatus of claim 1, comprising two or more functional device units, an input energy form of a specific functional device unit of the two or more functional device units being an output energy form, wherein the normalizing unit includes a calculating unit for calculating an average cost that is the cost required for producing a unit quantity of energy in the output energy form, and the determining unit is adapted to determine utilizing the calculated average cost, to which of the two or more functional device units a predetermined quantity of energy should be fed.

3. The apparatus of claim 1, wherein the two or more functional device units include two or more functional device units having a similar function;
    the predetermined quantity of energy is used by the two or more functional device units having the similar function to realize the similar function; and
    the determining unit is adapted to determine a usage ratio of each of the two or more functional device units having the similar function for realizing the similar function.

4. The apparatus of claim 3, wherein the determining unit comprises:
    a requested input quantity calculating unit for, when a request that can be realized using the two or more functional device units having the similar function is input from outside, calculating a requested input quantity when using each of functional device units usable to satisfy the request;
    a cost calculating unit for calculating a cost that will be incurred in the required input for each of the two or more functional device units having the similar function, using the normalizing unit; and
    a usage ratio determining unit for determining the usage ratio of each functional device unit based on the calculated cost.

5. The apparatus of claim 4, wherein the determining unit is adapted to calculate in the case where a request that can be realized by the functional device units is input from outside, by the requested input quantity calculating unit, an input quantity required by each of the two or more similar functional device units having the similar function in the case where the external request can be cooperatively satisfied by the similar functional device units, in addition to the case where the external request can be satisfied by one of the similar functional device units.

6. The apparatus of claim 4, comprising two or more functional device units, an input energy form of a specific functional device unit of the two or more functional device units being an output energy form, wherein the normalizing unit includes an average cost calculating unit for calculating an average cost that is the cost required to produce a unit quantity of energy in the output energy form;

the cost calculating unit is adapted to determine using the calculated average cost, the cost that will be incurred in the required input.

7. The apparatus of claim 6, wherein the average cost is calculated based on the history of the paid energy resource required for producing every unit quantity of output energy.

8. The apparatus of claim 3, wherein the system comprises a vehicle system, wherein the two or more functional device units include an internal combustion engine and a rotary electric machine as on-vehicle main engines.

9. The apparatus of claim 8, wherein the determining unit is adapted to determine whether the internal combustion engine should be operated or stopped, based on the direct comparison between a cost incurred in the system with the internal combustion engine being operated and a cost incurred in the system with the internal combustion engine being stopped.

10. The apparatus of claim 8, wherein the determining unit is adapted to determine that the engine should be used to realize a requested driving force, when the requested driving force cannot be realized by the motor-generator alone.

11. The apparatus of claim 8, wherein the two or more functional device units include an internal combustion engine and a rotary electric machine as on-vehicle main engines, a first heating unit intended to heat the vehicle interior using the waste-heat of the internal combustion engine, and a second heating unit including a heat-pump.

12. The apparatus of claim 11, wherein the determining unit is adapted to determine which of the first heating unit and the second heating unit should be used, based on the direct comparison between a cost for the case where the efficiency of the internal combustion engine is lowered and thus the waste heat is increased and a cost for the case where the second heating unit is used.

13. The apparatus of claim 11, wherein the determining unit is adapted to calculate a cost for the case where the first heating unit is used assuming that the internal combustion engine is in a quasi-stationary operating state, while the internal combustion engine is stopped.

14. The apparatus of claim 13, wherein the determining unit is adapted to predict a continuous traveling period of the vehicle while the internal combustion engine is stopped, and then to, if the predicted period is equal to or less than a predetermined length, determine that only the second heating unit should be used.

15. The apparatus of claim 3, comprising:

a priority determining unit for determining whether or not there is any request having a higher priority than the reduction of the cost for the system; and a prohibiting unit for if it determined by the priority determining unit that there is a request having a higher priority than the reduction of the cost, prohibiting assignment of a usage ratio to a functional device unit against the detected higher priority request.

16. The apparatus of claim 3, wherein the determining unit is further adapted to determine to which of the functional device units the charge-free energy should be fed such that the cost consumed by the system can be reduced.

17. The apparatus of claim 1, wherein the predetermined quantity of energy is charge-free energy.

18. The system of claim 15, wherein the determining unit is further adapted to determine into which of output energy forms of the two or more functional device units having different functions the charge-free energy should be preferentially converted, and feed the charge-free energy to a functional device unit whose input is given by the determined output energy form.

19. The apparatus of claim 16, wherein the determining unit includes:

a conversion quantity calculating unit for calculating a conversion quantity when the predetermined charge-free energy is converted into each of the output energy forms of the two or more functional device units having different functions;

a compensation cost calculating unit for by using the normalizing unit, for each of the output energy forms of the two or more functional device units having different functions, calculating a cost incurred in compensating the conversion quantity by energy other than the predetermined charge-free energy; and a priority assigning unit for assigning a higher priority to the output energy form into which the predetermined charge-free energy is converted with a larger compensation cost.

20. The apparatus of claim 19, wherein the determining unit includes an average cost calculating unit for calculating an average cost of output energy of the functional device units having a similar function, based on the history of the quantity of the paid energy resource required for producing every unit quantity of energy, for each of the functional device units having the similar function, and the compensation cost calculating unit has the capability to calculate the cost incurred in compensating, based on the calculated average cost.

21. The apparatus of claim 16, wherein the normalizing unit includes:

a first defining unit for by using the conversion unit in converting the charge-free energy into output energy of the functional device units, defining a restricted usage cost that is the cost required for converting energy other than the charge-free energy into output energy of the present functional device unit; and a second defining unit for defining an average cost for output energy for each of the functional device units having a similar function, wherein the determining unit includes a priority assigning unit for assigning a higher priority to the output energy form into which the predetermined charge-free energy is converted, with a smaller ratio of the restricted usage cost to the average cost.

22. The apparatus of claim 16, wherein the determining unit includes:

a second determining unit for determining whether or not there is any functional device unit undesirable to use in satisfying an external request, among the two or more functional device units; and a removing unit for if it determined that there is such an undesirable functional device unit, removing the undesirable functional device unit from the candidate destinations of feeding the charge-free energy.

23. The apparatus of claim 16, wherein the system comprises a vehicle system, wherein the charge-free energy includes energy extracted from drive wheels during deceleration of the vehicle, and the two or more functional device units include a charging unit that charges electric power and discharging the power to the exterior, and an on-vehicle air conditioning unit that includes a compressor driven by application of torque.

24. The apparatus of claim 16, wherein
the system comprises a vehicle system equipped with an internal combustion engine, wherein
the charge-free energy includes waste-heat energy from the internal combustion engine, and
the two or more functional device units include a heating unit for heating the vehicle interior using the waste heat and a generating unit for performing electric power generation using the waste heat.

25. The apparatus of claim 16, wherein
the system comprises a system installed in a residential building,
the charge-free energy includes solar-generated energy, and
the two or more functional device units include a supplying unit for supplying the solar-generated energy to an electric power company and a converting unit for converting the solar-generated energy into thermal energy.

26. The apparatus of claim 16, wherein
the system comprises a functional device unit installed in a vehicle and a functional device unit installed in a residential building, and
the determining unit has the capability to let one of the candidates of feeding the charge-free energy output from the functional device unit installed in the residential building be a charging unit equipped with the vehicle.

27. The apparatus of claim 1, wherein the normalizing unit has the capability to calculate the cost incurred in producing output energy of at least one functional device unit by referring to the history of the paid resource quantity required for producing every output energy of the at least one functional device unit.

28. The apparatus of claim 1, wherein the normalizing unit has the capability to calculate the cost estimated to be incurred in producing every output energy of at least one functional device unit, based on future prediction information of the environments where the at least one functional device unit is situated.

29. The apparatus of claim 1, wherein the two or more functional device units include a functional device unit that uses a paid energy resource as a direct energy source and a functional device unit that uses the output of the former functional device unit as a direct energy source.

30. The apparatus of claim 1, wherein the system comprises both a functional device unit installed in a vehicle and a functional device unit installed in a residential building.

* * * * *